US011353996B2

(12) United States Patent
Yang et al.

(10) Patent No.: US 11,353,996 B2
(45) Date of Patent: Jun. 7, 2022

(54) TOUCH-SENSING COVER AND MANUFACTURING METHOD THEREOF

(71) Applicant: TPK Universal Solutions Limited, Hong Kong (HK)

(72) Inventors: Shun-Jie Yang, New Taipei (TW); Shih-Ching Chen, Taoyuan (TW); Chen-Hui Cheng, Taoyuan (TW)

(73) Assignee: TPK Universal Solutions Limited, Hong Kong (HK)

( * ) Notice: Subject to any disclaimer, the term of this patent is extended or adjusted under 35 U.S.C. 154(b) by 196 days.

(21) Appl. No.: 16/653,380

(22) Filed: Oct. 15, 2019

(65) Prior Publication Data
US 2020/0117293 A1    Apr. 16, 2020

(30) Foreign Application Priority Data

Oct. 15, 2018    (CN) .......................... 201811195132.9

(51) Int. Cl.
*B32B 15/02*    (2006.01)
*G06F 3/044*    (2006.01)
*G06F 3/042*    (2006.01)

(52) U.S. Cl.
CPC .............. *G06F 3/044* (2013.01); *G06F 3/042* (2013.01); *B32B 15/02* (2013.01)

(58) Field of Classification Search
CPC .............. B32B 2260/00; Y10T 428/868; Y10T 428/851
See application file for complete search history.

(56) References Cited

U.S. PATENT DOCUMENTS

| 6,287,670 | B1* | 9/2001 | Benson | .................. G02B 5/124 428/172 |
| 2014/0293147 | A1* | 10/2014 | Tang | ..................... G06F 3/0445 349/12 |
| 2014/0313440 | A1* | 10/2014 | Hsu | ....................... G06F 3/0446 349/12 |
| 2018/0270403 | A1* | 9/2018 | Chung | ............. H01L 27/14625 |

\* cited by examiner

*Primary Examiner* — Adam Krupicka
(74) *Attorney, Agent, or Firm* — Idea Intellectual Limited; Margaret A. Burke; Sam T. Yip

(57) ABSTRACT

Covers for touch-sensing devices include a shielding layer; and a substrate, in which the substrate covers the shielding layer, and the substrate and the shielding layer are integrated and form a coplanar surface. The coplanar surface is a smooth surface, which has a surface roughness Ra in a range from about 0.05 μm to about 0.5 μm.

8 Claims, 20 Drawing Sheets

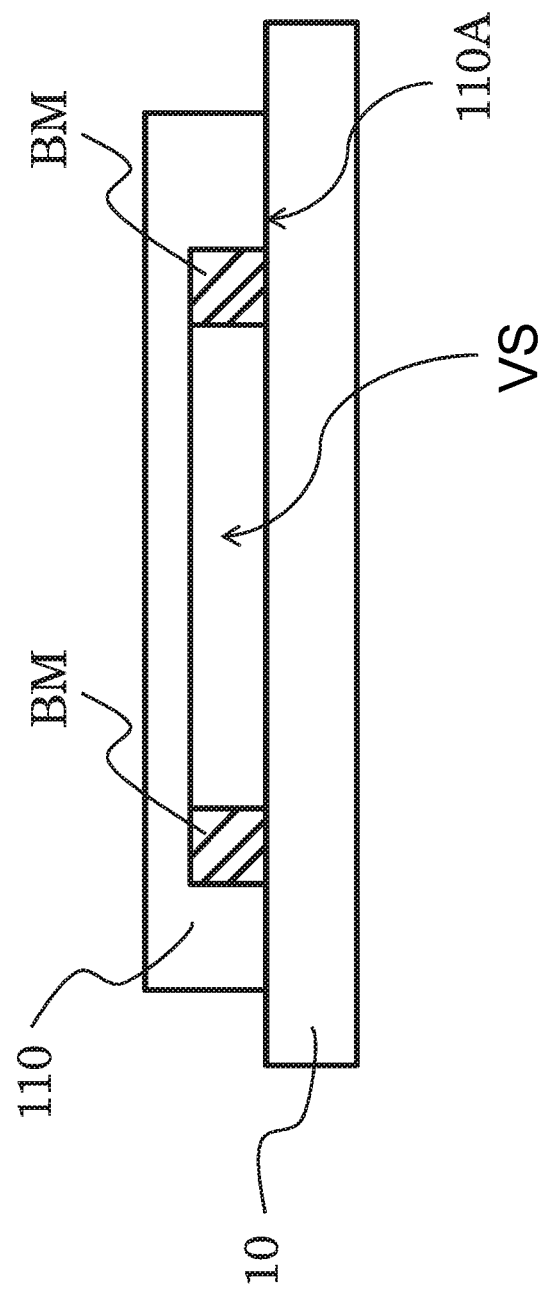

TOUCH-SENSING COVER AND MANUFACTURING METHOD THEREOF

CROSS-REFERENCE TO RELATED APPLICATION

This application claims priority to China Application Serial Number 201811195132.9, filed Oct. 15, 2018, which is herein incorporated by reference.

BACKGROUND

Technical Field

The present disclosure relates to a cover for touch-sensing devices and a manufacturing method thereof.

Description of Related Art

Due to the demand for flexible display devices, various transparent conductors have been developed, such as transparent conductors made of nanowires or the like.

When using the nanowires to fabricate touch sensing electrodes, a conventional process applies a nanowire layer on a cover. The cover is usually printed with a shielding layer to define a display area and a peripheral area. The shielding layer has a certain thickness to achieve sufficient optical density to shield peripheral traces or electronic parts of the peripheral area. Therefore, a protrusion structure of the shielding layer is formed. The thickness of the shielding layer is thicker than the nanowire layer, so that the nanowire layer has a large taper angle after printing and baking. As a result, the nanowire layer may have cracks, defects and even breaks when climbing on the protrusion structure of the shielding layer. In such a structure, electrical resistance of the touch sensing electrode and the peripheral trace may differ from between 15% and 20%. The large taper angle may also increase complexity of photolithography of photoresist required for patterning the nanowire layer.

Bonding strength between the shielding layer and the cover it is printed on may also reduce flexibility. Modern flexible touch panel specifications include a bending test of 100,000 bends at a bending radius of 2.5 millimeters (also called "R2.5").

SUMMARY

In some embodiments of the present disclosure, a touch-sensing cover having an embedded shielding layer may be fabricated, and the touch-sensing cover is applied to a touch panel to solve the issue of disconnection caused by a climbing structure, and an electrode having electrical and optical characteristics with high uniformity may be fabricated based on a smooth surface of the touch-sensing cover of the embodiment of the present disclosure.

Some embodiments of the present disclosure provide a method of manufacturing a touch-sensing cover. The method includes S1: providing a carrier plate; S2: forming a shielding layer over the carrier plate; S3: forming a substrate over the carrier plate, and the substrate covers the shielding layer; and S4: removing a composite structure formed by the substrate and the shielding layer from the carrier plate. The shielding layer is embedded in the substrate to form a coplanar surface.

In some embodiments of the present disclosure, step S2 includes: coating a material of the shielding layer over the carrier plate; and performing a curing step.

In some embodiments of the present disclosure, the material of the shielding layer includes a colored photoresist, an ink or a combination thereof; the curing step includes an exposure curing or a thermal curing.

In some embodiments of the present disclosure, step S2 includes: forming a first shielding layer over the carrier plate; forming a second shielding layer over the first shielding layer, the first shielding layer and the second shielding layer constituting the shielding layer.

In some embodiments of the present disclosure, step S2 includes: forming a first shielding layer over the carrier plate; forming a second shielding layer over the first shielding layer; and forming a third shielding layer over the second shielding layer, in which the first shielding layer, the second shielding layer and the third shielding layer constitute the shielding layer.

In some embodiments of the present disclosure, the first shielding layer, the second shielding layer, and the third shielding layer have different widths.

In some embodiments of the present disclosure, the first shielding layer, the second shielding layer, and the third shielding layer form a stepped shielding structure.

In some embodiments of the present disclosure, the first shielding layer and the third shielding layer have a first pattern, and the second shielding layer has a second pattern different from the first pattern.

In some embodiments of the present disclosure, step S3 includes: coating a material of the substrate over the carrier plate, the material of the substrate covering the shielding layer and filling a space defined by the shielding layer; and performing a curing step.

In some embodiments of the present disclosure, step S4 includes: separating the carrier plate from the composite structure by using a release method or a demolding method, in which a surface roughness of the coplanar surface is substantially same as or similar to a surface roughness of the carrier plate.

Some embodiments of the present disclosure provide a touch-sensing cover including: a shielding layer; and a substrate. The shielding layer is embedded in the substrate, and the substrate and the shielding layer form a coplanar surface. The coplanar surface is a smooth surface, which has a surface roughness Ra is in a range of from about 0.05 μm to 0.5 μm.

In some embodiments of the present disclosure, the substrate entirely covers the shielding layer and is filled in a space defined by the shielding layer. The material of the substrate is filled in a space enclosed by the shielding layer.

In some embodiments of the present disclosure, the shielding layer includes a first shielding layer and a second shielding layer.

In some embodiments of the present disclosure, the shielding layer includes a first shielding layer, a second shielding layer, and a third shielding layer.

In some embodiments of the present disclosure, the first shielding layer, the second shielding layer, and the third shielding layer form a stepped shielding structure.

In some embodiments of the present disclosure, the first shielding layer and the third shielding layer have a first pattern, and the second shielding layer has a second pattern different from the first pattern.

In some embodiments of the present disclosure, the shielding layer includes a hollow portion.

In some embodiments of the present disclosure, the coplanar surface is a smooth surface. The coplanar surface is a curved and smooth surface. The surface roughness of the smooth surface is in a range of from about 0.05 μm to 0.5 μm.

In some embodiments of the present disclosure, the cover is flexible. The cover including a shielding structure embedded in the substrate, and the shielding structure and the substrate forms an integrated cover.

BRIEF DESCRIPTION OF THE DRAWINGS

FIG. 2A is a cross-sectional view taken along line A-A of FIG. 2.

DETAILED DESCRIPTION

Figure 1:
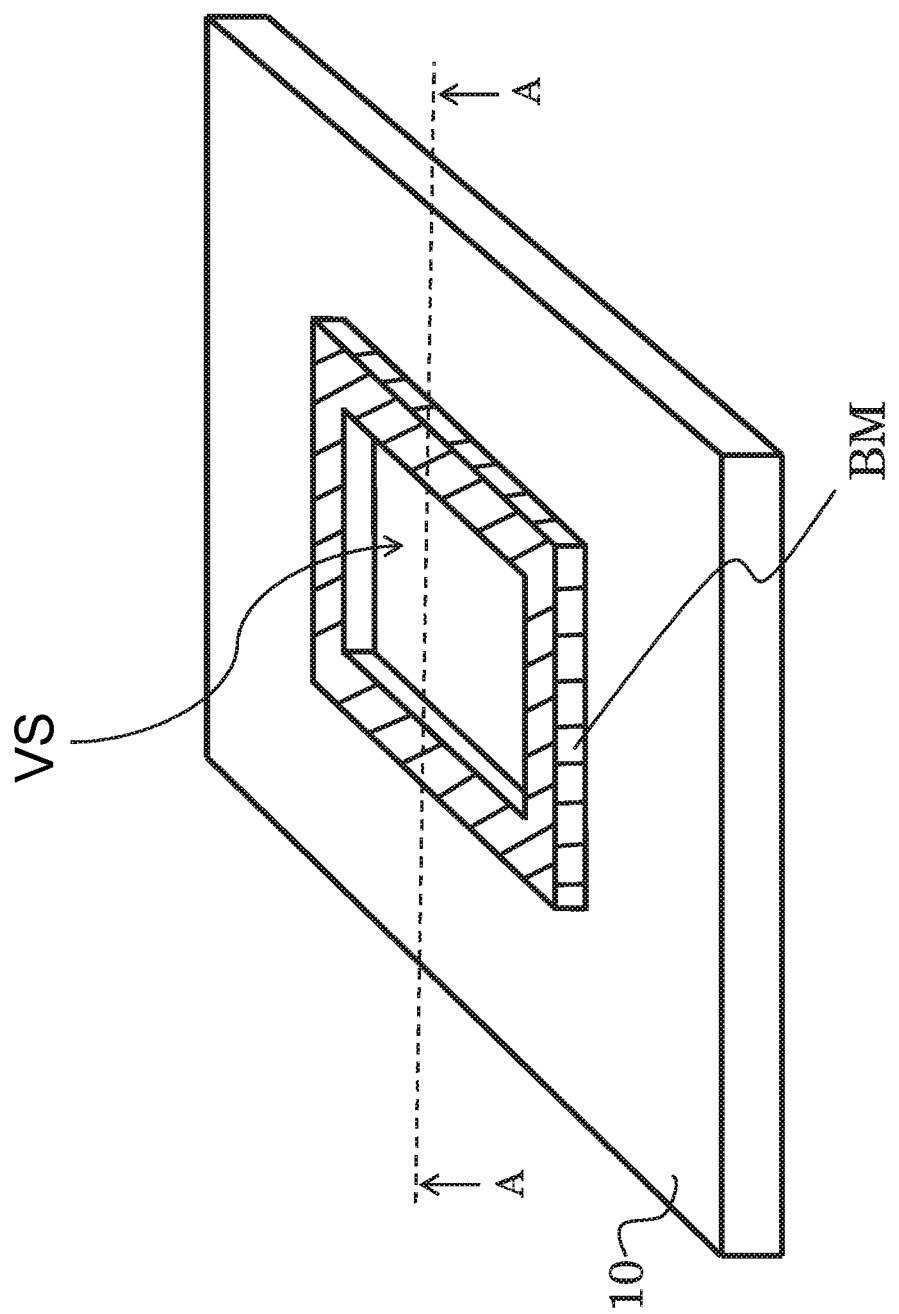
FIG. 1 is a schematic diagram of a first step of a method of manufacturing a touch-sensing cover according to an embodiment of the present disclosure.

The various embodiments of the present disclosure are disclosed in the drawings. For clarity, many practical details will be explained in the following description. However, it should be understood that these practical details are not intended to limit the invention. That is, in some embodiments of the present disclosure, these practical details are not necessary. In addition, some of the conventional structures and elements are shown in the drawings in a simplified schematic manner in order to simplify the drawings.

As used herein, "about", "approximately" or "substantially" generally means that an error or range of the value is within 20%, preferably within 10%, more preferably within 5%. Unless otherwise stated, the numerical values mentioned are considered as approximations, that is, they have an error or range as indicated by "about", "approximately" or "substantially." In addition, the "metal nanowires" and the "metal nanowire layer" used herein are the same or similar elements, and will be used interchangeably hereinafter.

Figure 1A:
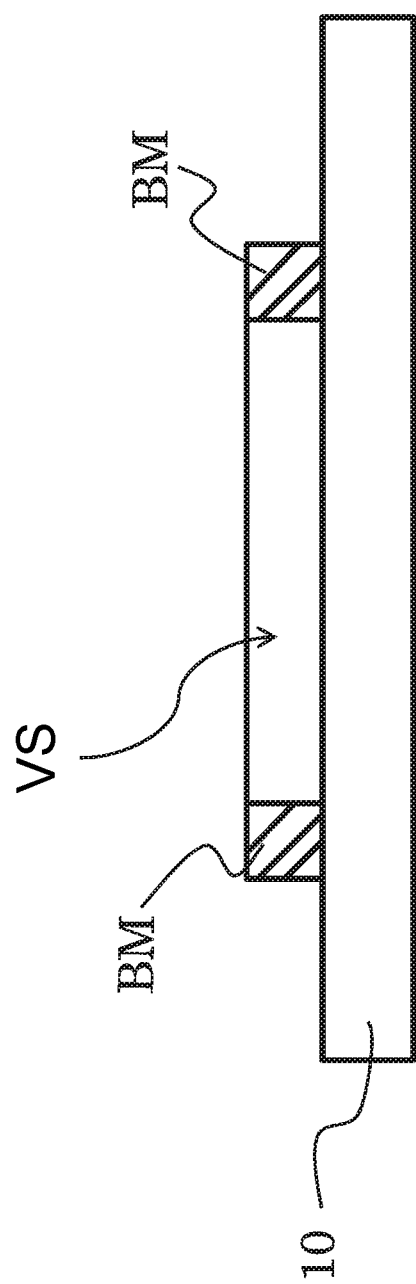
FIG. 1A is a cross-sectional view taken along line A-A of FIG. 1.

Some embodiments of the present disclosure provide a method of manufacturing a cover or a covering plate/window, which includes: providing a carrier plate 10; forming a shielding layer BM on the carrier plate 10; forming a substrate 110 over the carrier plate 10, the substrate 110 covering the shielding layer BM to form a composite structure; removing the composite structure from the carrier plate 10. As a result, the released composite structure is the formed cover plate, and the substrate 110 and the shielding layer BM of the formed cover plate have a coplanar surface. The exemplary processes of the manufacturing method are described below. First, referring to FIG. 1 and FIG. 1A, a carrier plate 10 is provided, and a shielding layer BM is detachably formed on the carrier plate 10. The carrier plate 10 is capable to carry or to support one or more processing objects. In some embodiments of the present disclosure, carrier plate 10 has mechanical rigidity, and a surface of the carrier plate 10 has a low roughness (e.g., the surface roughness Ra in a range of from about 0.05 μm to 0.5 μm). In some embodiments of the present disclosure, the carrier plate 10 may be made of a steel strip, a steel sheet or cyclo olefin polymer (COP). In some embodiments of the present disclosure, the shielding layer BM may be formed by using printing, such as screen printing, bar coating, micro gravure coating, or a photolithography process. The material of the shielding layer BM may be a colored photoresist, an ink or a combination thereof, which may be doped with a dye to have a specific color. Those materials mentioned above have deformable or flowable properties and may be cured by illumination or heating; in other words, after the material of the shielding layer BM is printed on the carrier plate 10, the material of the shielding layer BM may be cured by exposure, for example, by irradiating UV light; or by heating, such as using a heating plate or a furnace. In some embodiments of the present disclosure, the shielding layer BM may be made using a material having high optical density (OD) (e.g., an optical density of 4.0 or more). In other words, the shielding layer BM has a low light transmittance. For example, the material may include an ink, a photoresist, or a combination thereof, such as a black ink, a black photoresist, or a combination of the black ink and the black photoresist. The shielding layer BM may also be referred to as a light shielding layer, a decorative layer or a masking layer, which may have a predetermined pattern, such as a polygon, a circle, an L shape, a U shape, etc., which may be used to define a peripheral area PA and a display area VA described later. As shown in FIG. 1 and FIG. 1A, the shielding layer BM is a closed frame-like structure in which a space VS is formed.

The optical density of the shielding layer BM may be controlled by adjusting a thickness of the shielding layer BM. For example, the shielding layer BM having a thickness of 6 μm or more is formed, so that the shielding layer BM has the shielding effect on peripheral metal wires or controllers and the like.

Figure 2:
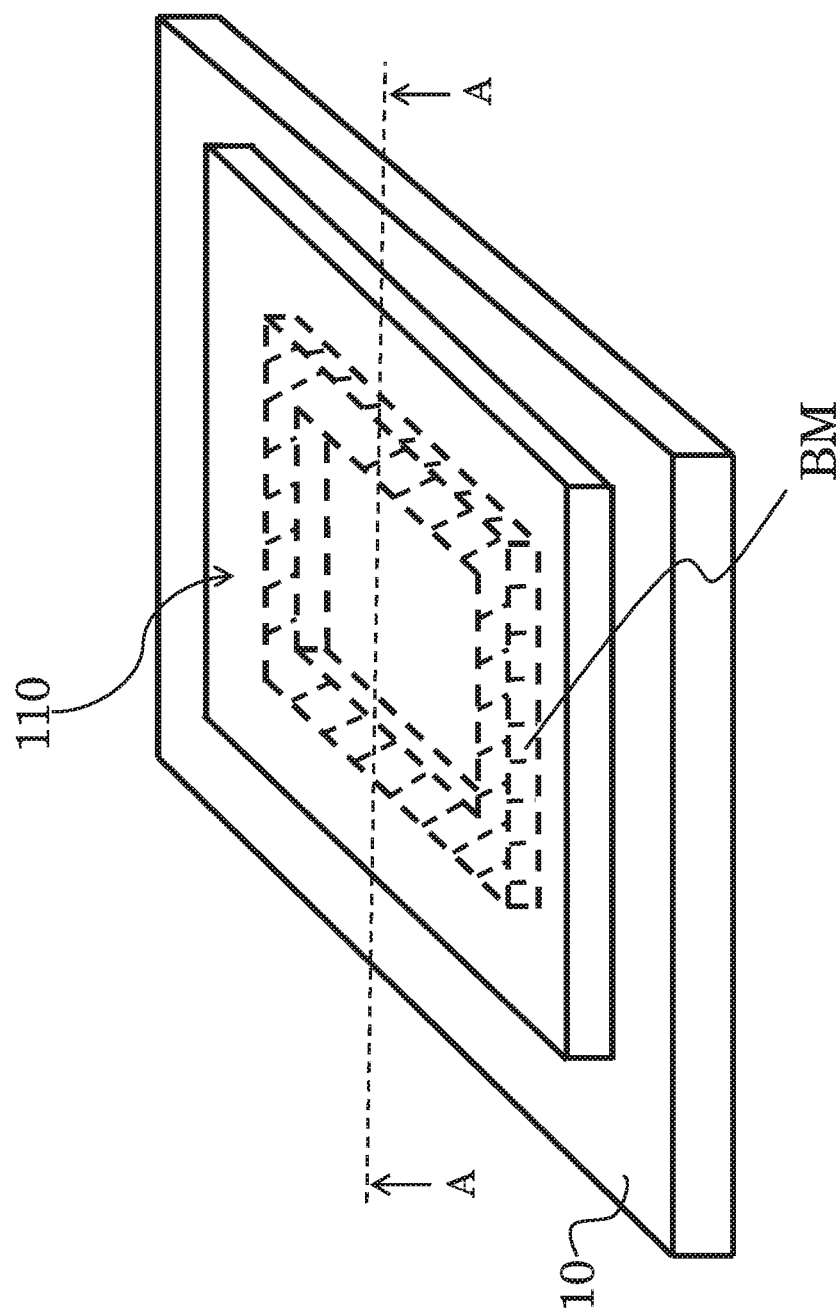
FIG. 2 is a schematic diagram of a second step of a method of manufacturing a touch-sensing cover according to an embodiment of the present disclosure.

Next, referring to FIG. 2 and FIG. 2A, the substrate 110 is formed on the carrier plate 10 and covering the shielding layer BM. In some embodiments of the present disclosure, the substrate 110 may be made of a transparent material, such as polymethylmethacrylate (PMMA), polyvinyl chloride (PVC), polypropylene (PP), polyethylene terephthalate (PET), polyethylene naphthalate (PEN), polycarbonate (PC), polystyrene (PS) and CPI (colorless polyimide). The above material may be formed over the carrier plate 10 by using a coating method and the coated material covers the shielding layer BM. Then, a curing/drying step may be performed to form the substrate 110. In an embodiment, the coated material entirely covers or wraps the shielding layer BM and is filled in the space VS defined by the shielding layer BM. A cross-sectional view as shown in FIG. 2A, after curing, a thickness of the substrate 110 is larger than the thickness of the shielding layer BM, such that the shielding layer BM is wrapped or embedded in the substrate 110. In detail, a first portion of the substrate 110 is formed in the space VS, and a second portion of substrate 110 is formed at an outer side of the shielding layer BM. In this way, the substrate 110 and the shielding layer BM form a composite/integrated structure in which the shielding layer BM is embedded in the substrate 110.

Next, the composite structure formed by the substrate 110 and the shielding layer BM is removed from the carrier plate 10 to form a product of a cover of the embodiments. In an embodiment, a release method or a demolding method may be utilized to separate the carrier plate 10 from the composite structure. In other words, the carrier plate 10 is configured to support and carry the substrate 110 and the shielding layer BM in forming steps and a reused/re-cycled carrier plate 10 may be used to save the cost of manufacturing the covers. In another embodiment, the carrier plate 10 may be configured to protect the composite structure formed by the substrate 110 and the shielding layer BM, for example, the carrier plate 10 may be used to protect the composite structure mentioned above when it is transported between workstations or before subsequent assembly operations to prevent the substrate 110 and the shielding layer BM from being scratched or the like.

Figure 3:
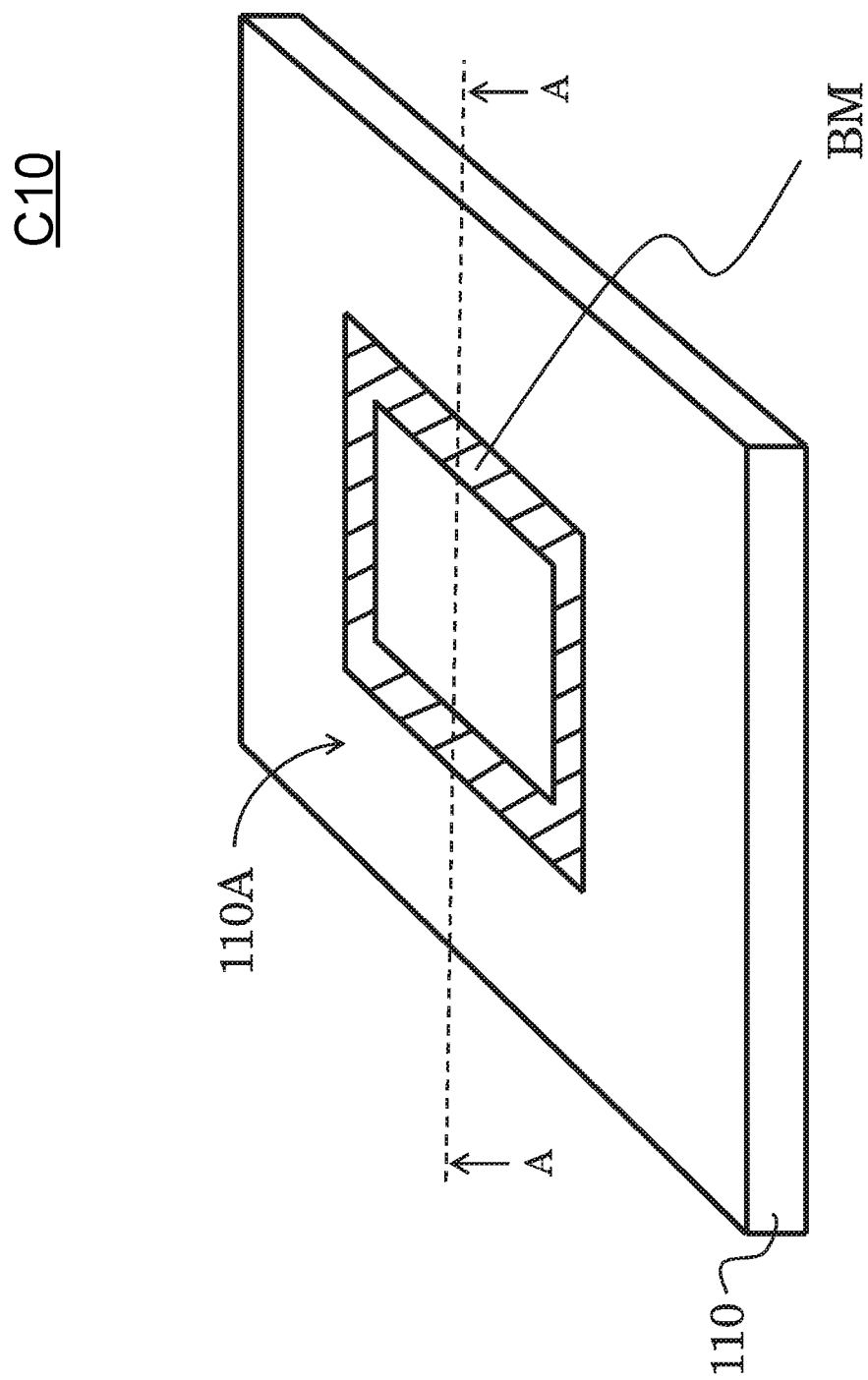
FIG. 3 is a schematic diagram of a touch-sensing cover according to an embodiment of the present disclosure.
Figure 3A:
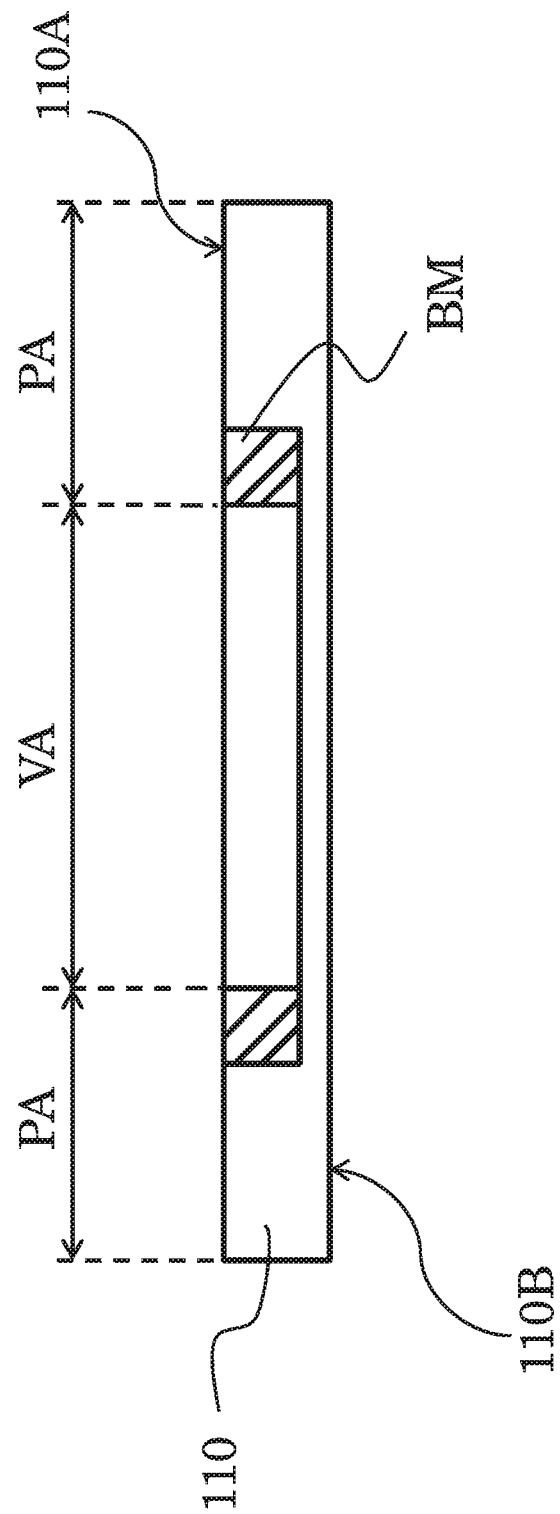
FIG. 3A is a cross-sectional view taken along line A-A of FIG. 3.

FIG. 3 and FIG. 3A show a composite structure of the embodiment that is released from the carrier plate 10, which is the cover C10 for a touch-sensing panel or a display. After the releasing step, the shielding layer BM is embedded in the substrate 110, and a released surface, i.e., a first surface 110A is formed, which may be referred to as a working surface or an inner surface. In detail, when the carrier plate 10 is released, the shielding layer BM forms a bare/exposed surface (i.e., the surface of the shielding layer BM in contact with the carrier plate 10). Similarly, the substrate 110 also forms two bare/exposed surfaces. One is a surface of the first portion of the substrate 110 in contact with the carrier plate 10, and the surface is located inside the shielding layer BM. The other is a surface of the second portion of the substrate 110 in contact with the carrier plate 10, and the surface is located outside the shielding layer BM. The three bare/exposed surfaces may form a coplanar surface, which is the first surface 110A. Since the first surface 110A (i.e., coplanar surface) is fabricated by the above-described release operation, the surface roughness thereof is substantially same as or similar to the surface roughness of the carrier plate 10. In view of the smooth surface of the composite structure, the carrier plate 10 of the present embodiment is a sheet with a low surface roughness (i.e., a smooth surface), and thus the formed composite structure/cover C10 can also have a smooth surface with a low surface roughness corresponding to the carrier plate 10. In addition, based on the flexibility of the materials of the substrate 110 and the shielding layer BM, the formed cover C10 is flexible.

Furthermore, based on the aforementioned coplanar structure and the low surface roughness characteristic, when a process such as forming an electrode over the first surface 110A is subsequently performed, the issue of the wire climbing in the conventional structure may be solved, and the electrode characteristics (e.g., impedance/resistance, light transmittance, haze, etc.) can have high uniformity. The first surface 110A of the present embodiment may be used for subsequent processes such as, but not limited to, coating a conductive layer, coating a metal layer, an etching process, a photolithography process, and the like. Furthermore, the cover has a second surface 110B (or may be referred to as an outer surface or a contact surface) with respect to the first surface 110A. After the cover C10 of the embodiment is assembled or is processed to form a touch panel, the second surface 110B is acted as a touch operation interface for a user, but not limited thereto.

Referring to FIG. 3A, the cover of the embodiment may be applied to an outermost cover (also referred to as a touch-sensing cover) of a touch panel, in which the shielding layer BM may be used to define the peripheral area PA and the display area. VA. In an embodiment, the first portion of the substrate 110 in the space VS is substantially located in the defined display area VA to facilitate image output of the display and the second portion of the substrate 110 and the shielding layer BM are substantially located in the defined peripheral area PA. The embedded shielding layer BM is used at least to shield the peripheral metal traces or controllers and the like, and thus an operator/user is not easily to observe the above-mentioned components. The second portion of the substrate 110 of FIG. 3A may be shielded or covered by an external housing member (not shown), so that the above-mentioned component is not exposed.

In some embodiments, one or more hollow portions 160 (see FIG. 4A) may be formed in the shielding layer BM, such as various holes, openings. If necessary, the hollow portion(s) 160 may be filled with different materials, such as silver paste, IR ink (i.e., ink that allows IR to pass through and blocks visible light and ultraviolet light) and so on. For example, the electronic device may include an infrared emitter, and the shielding layer BM may include an opening corresponding to the infrared emitter, which may be filled with the IR ink, so that the infrared emitter can emit light through the IR ink. The hollow portion 160 in the shielding layer BM may not be filled with a material and is just a hollow penetration space. In another embodiment, the above-mentioned hollow portion may be extended from the shielding layer BM to the substrate 110; that is, the hollow portion extends from the first surface 110A to the second surface 110B.

Figure 4A:
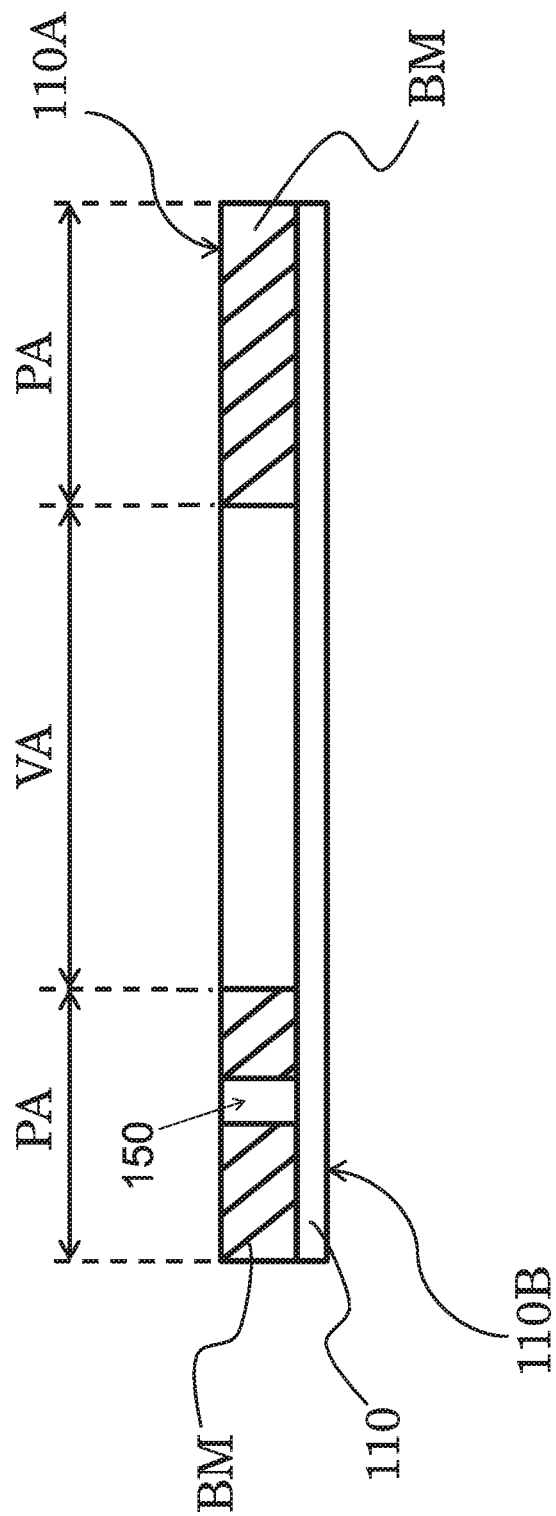
FIG. 4A is a schematic diagram of a touch-sensing cover according to another embodiment of the present disclosure.

FIG. 4A shows a cover of another embodiment, in which a width of the shielding layer BM may extend to an end surface of the substrate 110, so the width of the shielding layer BM may be substantially equal to a width of the peripheral area PA. In detail, when the carrier plate 10 is released, the shielding layer BM of the embodiment forms a bare/exposed surface (i.e., a surface of the shielding layer BM in contact with the carrier plate 10. Similarly, the substrate 110 also forms a bare/exposed surface (i.e., a surface of the first portion of the substrate 110 inside the shielding layer BM and in contact with the carrier plate 10). The two bare/exposed surfaces may form a coplanar surface as the above-mentioned first surface 110A.

Figure 4B:
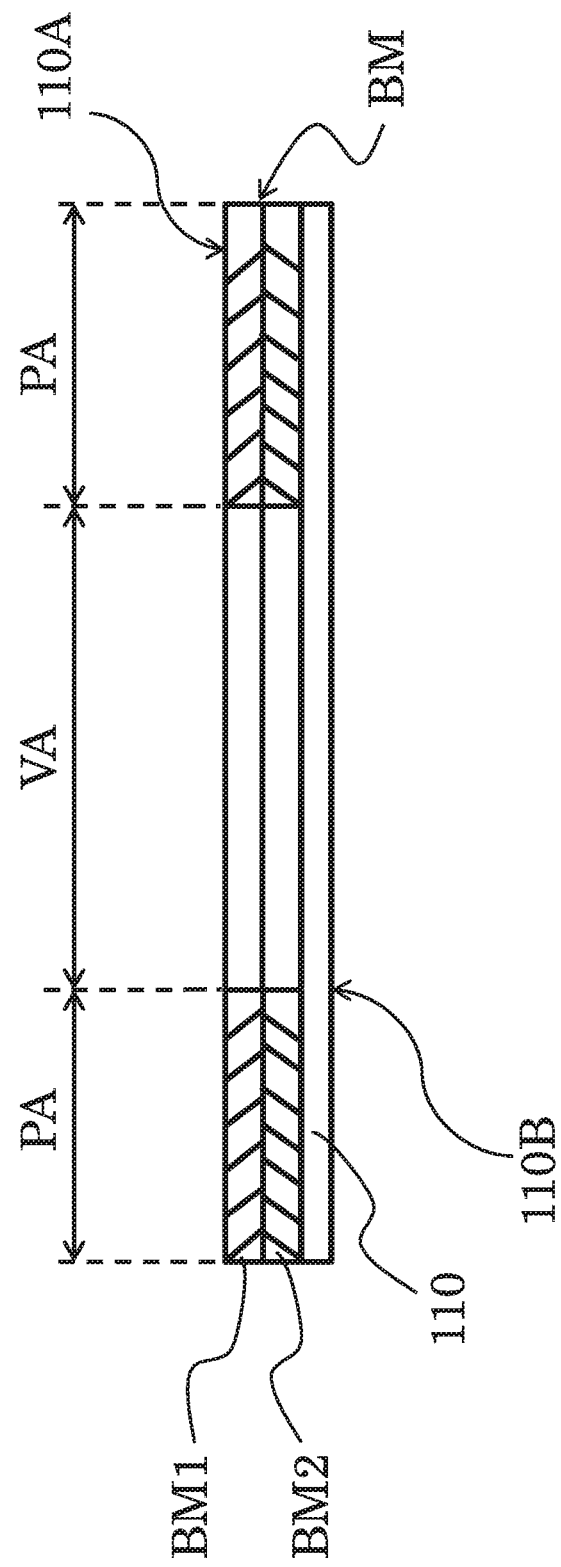
FIG. 4B is a schematic diagram of a touch-sensing cover according to another embodiment of the present disclosure.

FIG. 4B shows a cover of another embodiment, in which the shielding layer BM is a multi-layered structure. The specific processes of the manufacturing method of the present embodiment at least includes the following steps: forming a first shielding layer BM1 over a carrier plate 10, and forming a second shielding layer BM2 over the first shielding layer BM1, and the first shielding layer BM1 and the second shielding layer BM2 constituting the shielding layer BM of a two-layer structure; and then forming a substrate 110. Then, releasing the carrier plate 10 to form the composite structure. Both the first and second shielding layers BM1, BM2 are embedded in the substrate 110. The first shielding layer BM1 and the substrate 110 form a coplanar surface acted as the above-mentioned first surface 110A. This embodiment can refer to the foregoing description, and details are not described herein again. The first shielding layer BM1 and the second shielding layer BM2 may have the same or different optical density coefficients, so that the optical density coefficient of the shielding layer BM may be adjusted according to actual product requirements to reduce light transmittance of the shielding layer BM or to adjust the color displayed by the shielding layer BM to increase aesthetics.

Figure 4C:
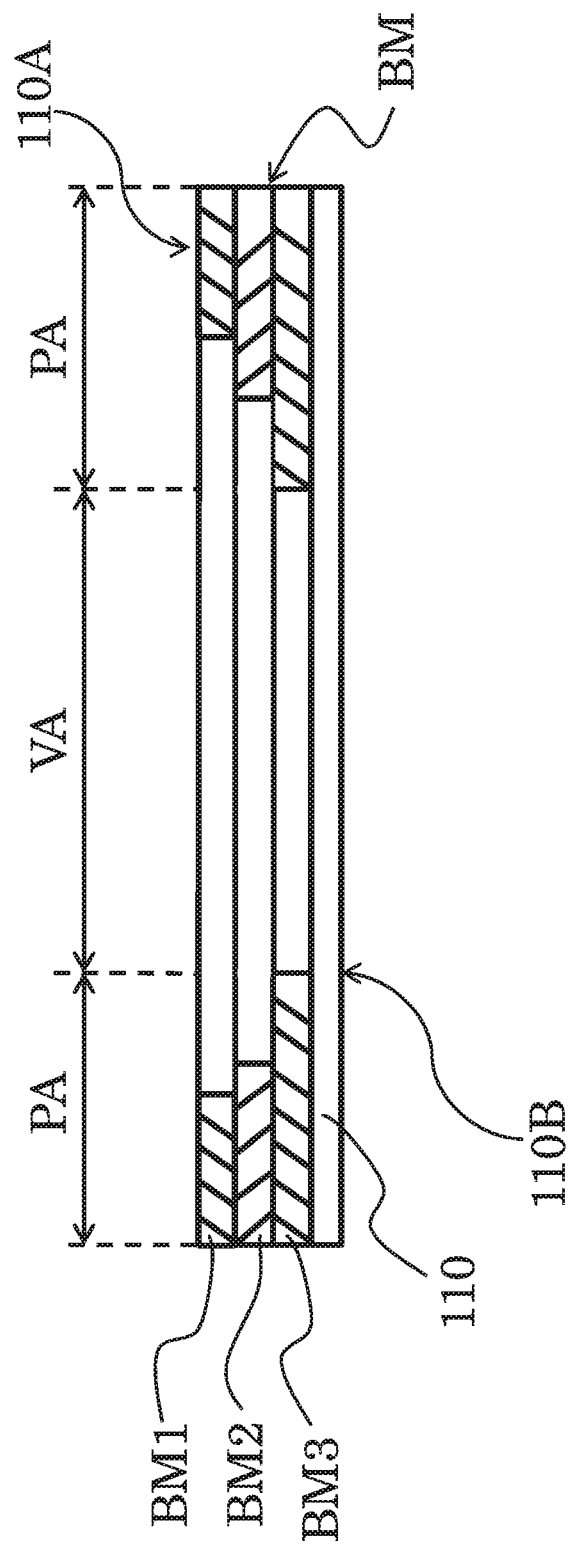
FIG. 4C is a schematic diagram of a touch-sensing cover according to another embodiment of the present disclosure.

FIG. 4C shows a cover of another embodiment, in which the shielding layer BM is a multi-layer structure, and those layers have different widths to form a stepped shielding structure, for example, a third shielding layer BM3 closest to a second surface 110B touched by a user has the longest width, and a width of the second shielding layer BM2 and a width of the first shielding layer BM1 are sequentially decreased to form a stepped shielding structure. The manufacturing method of the embodiment includes at least the following steps: forming a first shielding layer BM1 over a carrier plate 10, and forming a second shielding layer BM2 over the first shielding layer BM1, and forming a third shielding layer BM3 over the second shielding layer BM2, and the first, second, and third shielding layers BM1-BM3 constituting the shielding layer BM; and then forming a substrate 110. Then, releasing the carrier plate 10 to form the composite structure. All the first, second and third shielding layers BM1, BM2, BM3 are embedded in the substrate 110. The width of the third shielding layer BM3 may be used to define the peripheral area PA. The first shielding layer BM1 and the substrate 110 form a coplanar surface acted as the above-mentioned first surface 110A. In addition, during the process of coating the substrate 110 in a printing process, a material of the substrate 110 may flow toward the carrier plate 10 along the stepped structure to push out air to prevent bubbles from being generated at the contact surface of the substrate 110 in contact with the shielding layer BM. The embodiment can refer to the foregoing description, and details are not described herein again.

Furthermore, the structure in FIG. 4C may be further changed by the combination of the first shielding layer BM1 and the second shielding layer BM2 to achieve a color change effect of the frame. For example, a material having optical density in a range of between 0.3 and 0.67 (e.g., light-colored ink such as a white or yellow ink) is used to form the first shielding layer BM1, and the first shielding layer BM1 has a first pattern (e.g., the aforementioned frame pattern). On the other hand, a material having an optical density greater than that of the first shielding layer BM1 (e.g., ink such as a red ink) is used to form the second shielding layer BM2 over the first shielding layer BM1, and the second shielding layer BM2 has a specific pattern/shape, such as a logo, function key icon or styling pattern. That is, the second shielding layer BM2 of the present embodiment has a second pattern (i.e., non-frame structure) different from the first pattern, and the second shielding layer BM2 having the pattern is disposed at a chosen position on the first shielding layer BM1. The second shielding layer BM2 may be referred to as a pattern layer. In an embodiment, the above-mentioned pattern layer may be, but not limited to, a logo of a product brand. The above-mentioned functional key icon may be, but not limited to, a return key or Home key commonly used in smart phones. The above-mentioned styling pattern may be, but not limited to, an aesthetic visual pattern such as stripes or grids. In another embodiment, a material having higher optical density than that of the first shielding layer BM1 and that of the second shielding layer BM2 (e.g., black ink described above) is used to form the third shielding layer BM3 having the first pattern (e.g., frame pattern described above), and thus the pattern layer (i.e., the second shielding layer BM2) is interposed between the first shielding layer BM1 and the third shielding layer BM3. Finally, the substrate 110 is formed according to the foregoing description to form the cover structure of the embodiment. The pattern and color of the second shielding layer BM2 may be presented through the first shielding layer BM1 due to the low optical density (i.e., high light transmittance) of the first shielding layer BM1. For example, a white ink is used to form the first shielding layer BM1, and a red ink is used to form the second shielding layer BM2, and thus the user can see the red pattern presented by the second shielding layer BM2. The red pattern may create a slightly pink effect through the white ink, and thus the vision effect of the logo, function key icon, or styling pattern formed by the second shielding layer BM2 is soft and gentle, and the overall color of the peripheral area PA is more harmonious and consistent. In order to achieve color consistency presented by the peripheral area PA, the color tolerance difference between the overlapping area of the first shielding layer BM1 and the second shielding layer BM2 and the area having only the first shielding layer BM1 is in a range of between 0.5 and 15, or in a range of between 1.3 and 12 (without considering the third shielding layer BM3). In addition, the third shielding layer BM3 is the structure/material with the highest optical density among the three layers, so as to shield peripheral metal traces (e.g., the peripheral wires 120 described later) or controllers and the like.

Figure 4D:
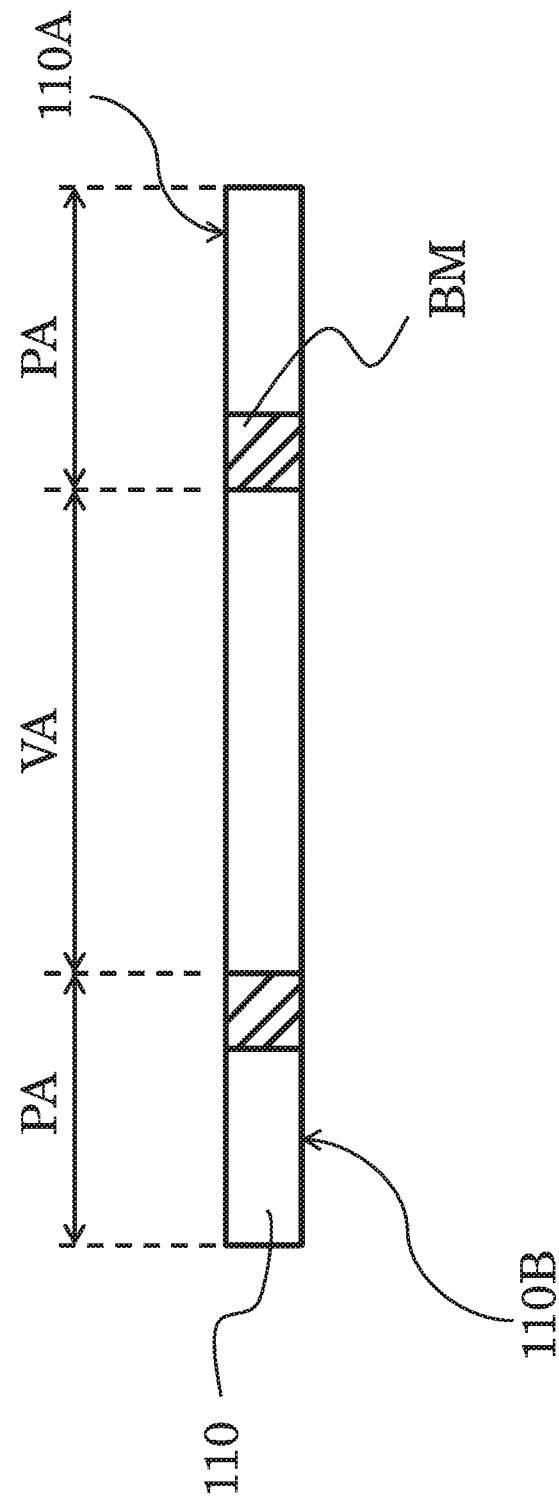
FIG. 4D is a schematic diagram of a touch-sensing cover according to another embodiment of the present disclosure.

FIG. 4D shows a cover of another embodiment, in which a thickness of the substrate 110 is substantially same as a thickness of the shielding layer BM. In a cross-sectional view, the shielding layer BM is embedded in the substrate 110 but two surfaces of the shielding layer BM are exposed. The shielding layer BM and the substrate 110 also form a composite type cover, and constitute the aforementioned second surface 110B and the first surface 110A.

The cover of the embodiment of the present disclosure may be applied to a touch panel, and thus can also be referred to as a touch-sensing cover or a touch-sensing lens. The application of the cover of the embodiment of the present disclosure to the touch panel will be described below.

Figure 5:
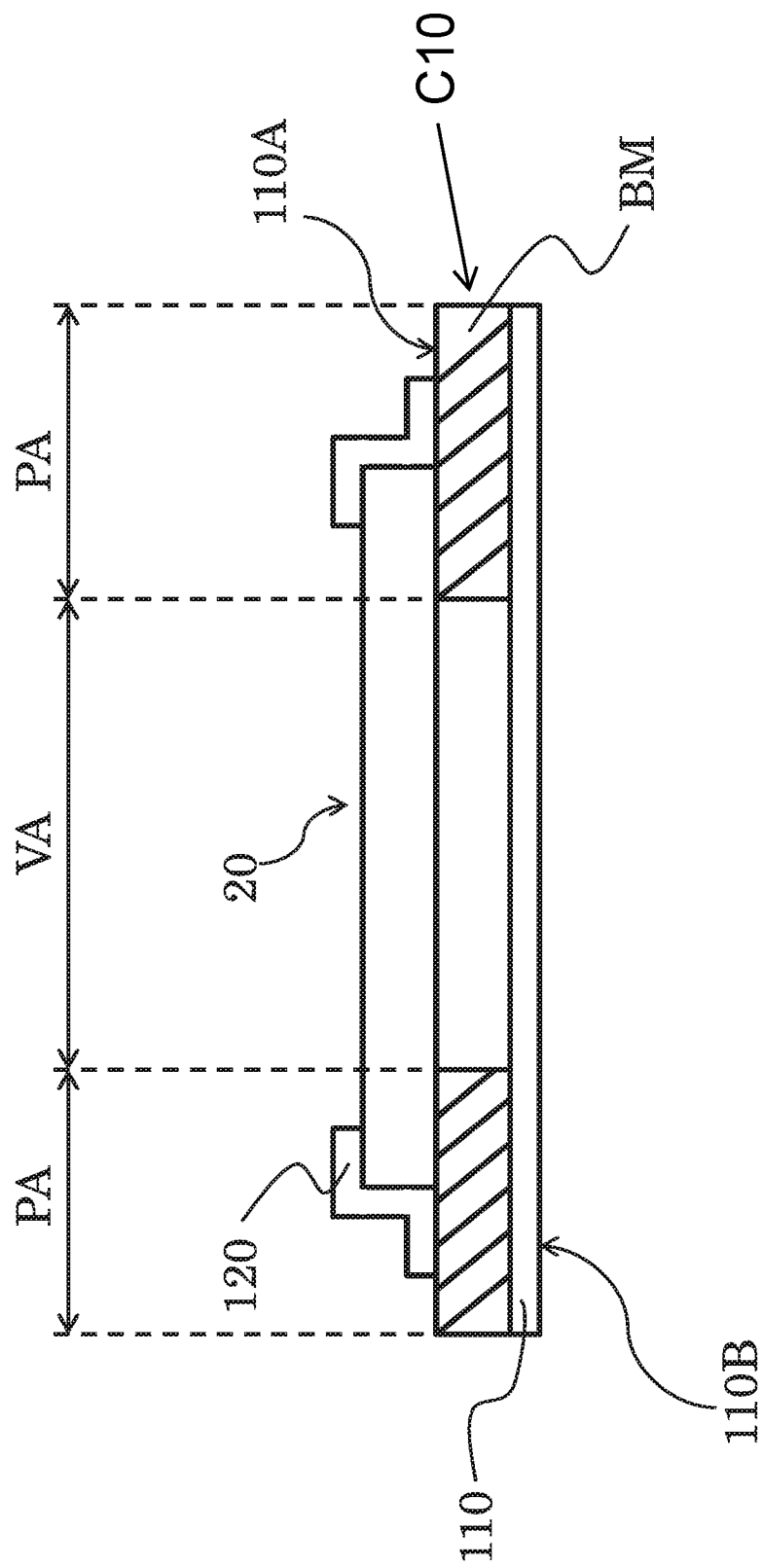
FIG. 5 is a schematic diagram of a touch panel according to an embodiment of the present disclosure.

A flexible touch sensing component 20, such as a film-type touch sensor, may be directly formed or attached over the cover of the embodiment of the present disclosure. The formed cover (i.e., a touch-sensing cover) having the touch sensing function may be assembled with a display module (not shown) to form a touch-sensing display. For convenience of description or drawing, the flexible touch sensing component 20 is presented as a single structural layer (as shown in FIG. 5) and does not actually depict the electrode structure. The flexible touch sensing component 20 includes a film having an electrode structure (not shown) thereon, and the flexible touch sensing component 20 may be directly adhered to the first surface 110A. After assembling the flexible touch sensing component 20 with the cover, the flexible touch sensing component 20 is substantially located at the display area VA, and the peripheral wires 120 are substantially located at the peripheral area PA. The peripheral wires 120 may be electrically connected to the electrode structure of the flexible touch sensing component 20, and the peripheral wires 120 are shielded by the shielding layer BM. When the user performs a control action such as clicking, gesture, etc. on the second surface 110B of the cover, the flexible touch sensing component 20 may be used to sense the foregoing action and transmit touch sensing signals to the external controller (not shown) through the peripheral wires 120.

Figure 6A:
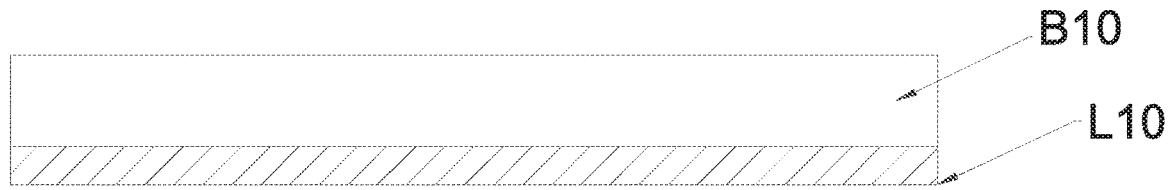
FIGS. 6A-6F are schematic diagrams showing a method of manufacturing a touch panel according to an embodiment of the present disclosure.

Since the cover of the embodiment of the present disclosure is made of a bendable (i.e., flexible) material, the cover of the present disclosure may be shaped to have a curved but smooth surface. For example, the above-mentioned first surface 110A of the cover is a curved but smooth surface. In combination with the flexibility of the flexible touch sensing component 20, the product (i.e., a touch-sensing panel) having the touch sensing function assembled by the two components can be attached to a flat or non-flat (e.g. having a curved surface) target. For example, the flexible product may be attached to a 2.5D or 3D display to allow the device to have touch sensing functions. The above-mentioned cover (i.e., the touch panel) may also be attached to the flexible display to let it have the touch sensing function. A plurality of release processes is utilized to apply the cover of the embodiment of the present disclosure to desired devices. Please refer to FIG. 6A, a first substrate B10 is provided, and a first release layer L10 is formed over the first substrate B10. The first substrate B10 can be served as a mechanical support for the stackup formed in the subsequent steps. In other words, the first substrate B10 can be served as a temporary platform for subsequent processes, and the product can be removed from the first substrate B10 after the manufacturing processes are completed. The first substrate B10 may be a transparent or opaque insulating material, such as a glass substrate, or the first substrate B10 may be a flexible substrate. Since the first substrate B10 does not constitute a part of the final product, a relatively low cost material as long as it provides the necessary mechanical support may be used for the first substrate B10. For example, the first substrate B10 may be made of plain glass instead of chemically strengthened glass to reduce the manufacturing cost of the touch panel, and may also be made of a flexible material such as plastics or resin, such as a polyester material such as polycarbonate (PC), polymethyl methacrylate (PMMA) or polyethylene terephthalate (PET), polyethersulfone (PES), polyimide (PI), cellulose ester, benzocyclobutene (BCB), polyvinyl chloride (PVC) or an acrylic material. In addition, after the first substrate B10 is removed from the touch sensor 10, it can be recycled to reuse. Therefore, the manufacturing cost may be further reduced. The first release layer L10 is a film layer made of a material having release ability. The release ability described herein and hereinafter means that the first substrate B10 may be bonded to the first release layer L10 and also be detached or separated from the first release layer L10 when necessary; or the first substrate B10 and the first release layer L10 may be attached to each other and then attached to a target, and both of the first substrate B10 and the first release layer L10 can be removed/detached/separated from the target when necessary.

A material of the first release layer L10 may be an organic material such as polyimide (PI), polypropylene (PP), polystyrene (PS), acrylonitrile butadiene styrene (ABS), polyethylene terephthalate (PET), polyvinyl chloride (PVC), polycarbonate (PC), polyethylene (PE), polymethyl methacrylate (PMMA), polytetrafluoroethylene (PTFE), cyclic olefin polymer (COP, Arton) or a combination thereof. The first release layer L10 may be formed over the first substrate B10 by using an ink coating process and a thermal baking method, or a vapor deposition method, a roll-to-roll (RTR) method or other suitable methods. An alternative method is to laminate a dry film of the first release layer L10 onto the first substrate B10. In one embodiment, the first release layer L10 may be adhered to the first substrate B10 by using a removable adhesive. The removable adhesive may include a water-insoluble adhesive or any other suitable material capable of temporarily adhering two layers of materials together and being dissolved or otherwise removed as needed. In this embodiment, the process of releasing the first substrate B10 from the first release layer L10 may be achieved by dissolving the removable adhesive.

In one embodiment, the first release layer L10 may be a film layer having an upper layer of a material with release ability and a lower layer of a material without release ability. The upper layer of the first release layer L10 may refer to a surface away from the first substrate B10, and the lower layer of the first release layer L10 refers to a surface close to the first substrate B10. Therefore, the first substrate B10 is attached to the lower layer of the first release layer L10, and a target device is attached to the upper layer of the first release layer L10. Then, the release process can be performed to remove the first substrate B10 and the first release layer L10 from the target device through the upper layer of the first release layer L10. In the embodiment, the first substrate B10 and the first release layer L10 are simultaneously and substantially completely removed (i.e., released) to prevent the first substrate B10 and the first release layer L10 from remaining on the product resulting in increase of product weight or thickness on the product and also prevent the remaining first release layer L10 from affecting optical properties of the product, such as transmittance and haze.

Figure 6B:
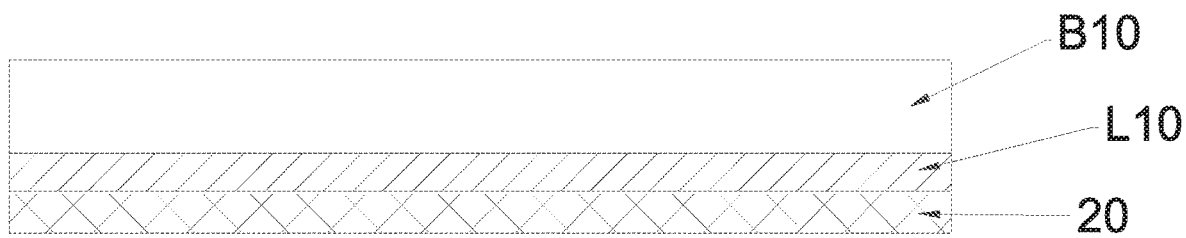

Next, referring to FIG. 6B, the flexible touch sensing component 20 is formed over the first release layer L10, and the first release layer L10 is located between the first substrate B10 and the flexible touch sensing component 20. As described above, the flexible touch sensing component 20 is a thin film touch sensor. In an embodiment, the thin film touch sensor may include a film and a transferable transparent conductive film attached to the film. The thin film touch sensor is flexible or deformable, that is, the film sensor may be dynamically or permanently formed into a curved shape.

Figure 6C:
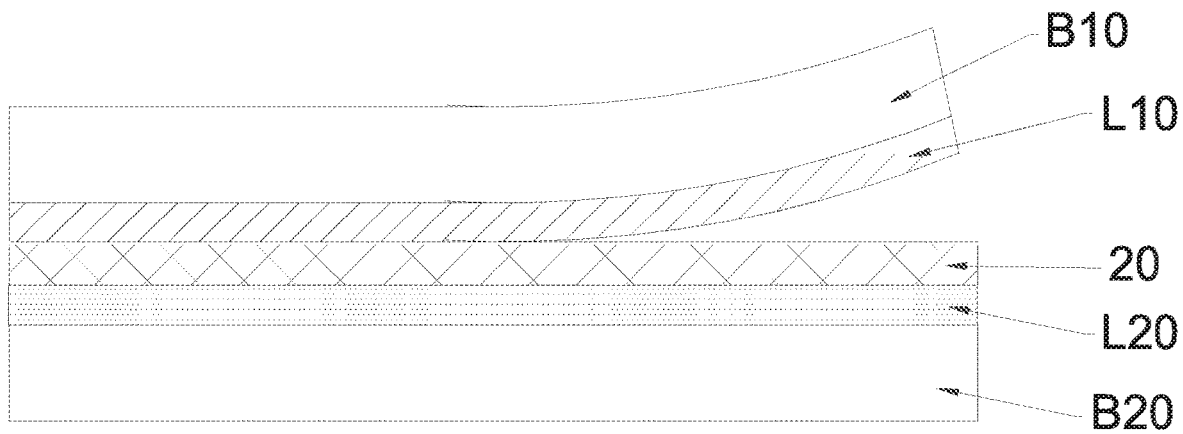

Next, referring to FIG. 6C, a second substrate B20 is formed over the flexible touch sensing component 20, and there is a second release layer L20 disposed between the flexible touch sensing component 20 and the second substrate B20. For the second release layer L20, reference may be made to the foregoing description for the first release layer L10, and the second release layer L20 and the first release layer L10 are film layers made of materials having release ability, but chemical compositions of the two layers may be same or different. The second substrate B20 may refer to the foregoing description for the first substrate B10, which may be same as or different from the material of the first substrate B10. In this embodiment, the second substrate B20 is also acted as a carrier, and thus the second substrate B20 may be referred to as a carrier plate. Alternatively, a film material having desired supporting strength may be selected as the second substrate B20, and thus second substrate B20 can also be referred to as a carrier film. FIG. 6C also shows a schematic diagram of the release step of removing the first substrate B10 from the flexible touch sensing component 20 through the first release layer L10 as discussed above. In the releasing step, the first substrate B10 may be removed by using a chemical etching method using an etchant such as hydrogen fluoride; or the first substrate B10 may be removed by using a mechanical method or a combined chemical-mechanical method. As discussed above, the first substrate B10 and the first release layer L10 may be removed simultaneously, so that the final product of touch panel have light and thin characteristics while maintaining good optical characteristics. In a variant embodiment, during the step of releasing, the first release layer L10 may remain over the flexible touch sensing component 20, and the remaining first release layer L10 may provide required adhesiveness for subsequent processes.

Figure 6D:
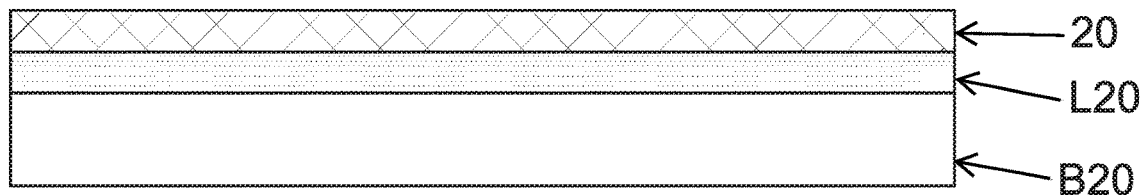

Next, referring to FIG. 6D, after the first substrate B10/first release layer L10 is removed, the flexible touch sensing component 20 is supported by the second substrate B20 for the preparation of transferring the flexible touch sensing component 20 to the target, such as a flat or a non-flat substrate, i.e., a curved substrate or a substrate having curved surfaces. In an embodiment, the target substrate may be a curved cover, which may be rigid, semi-rigid, flexible or deformable. The flexible touch sensing component 20 is removably attached to the second substrate B20 through the second release layer L20.

Figure 6E:
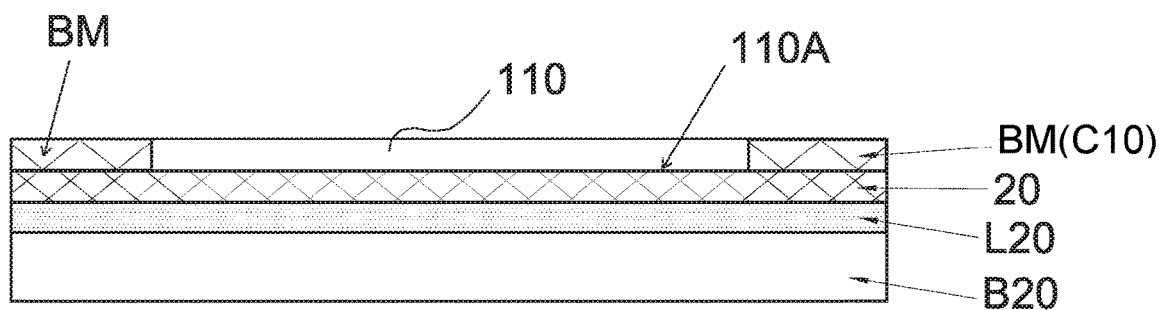

Next, please refer to FIG. 6E, which shows that the cover C10 of the embodiment of the present disclosure may be attached to the flexible touch sensing component 20. In other words, a bonding assembly operation may be performed on the flexible touch sensing component 20 by the support of the second substrate B20. The flexible touch sensing component 20 is attached to the first surface 110A formed by the shielding layer BM and the substrate 110 of the embodiment of the present disclosure. In an embodiment, the cover C10 of the embodiment of the present disclosure may be attached to the flexible touch sensing component 20 by using a bonding layer (not shown), and the bonding layer may be a viscous reactive ink, a common optical adhesive layer or a hydrogel layer. In an embodiment, the cover C10 of the embodiment of the present disclosure may be shaped to have a desired curved-surface.

Figure 6F:
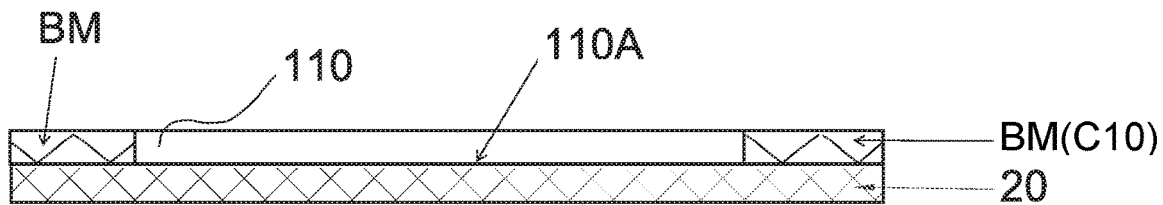

Next, please refer to FIG. 6F, which shows that the second substrate B20/the second release layer L20 is removed from the flexible touch sensing component 20 through. After the step of releasing, the cover C10 and the flexible touch sensing component 20 of the embodiment of the present disclosure can form an outer window having a touch sensing function, and may be assembled and/or attached to the above-mentioned display to form a touch-sensing display.

Figure 7A:
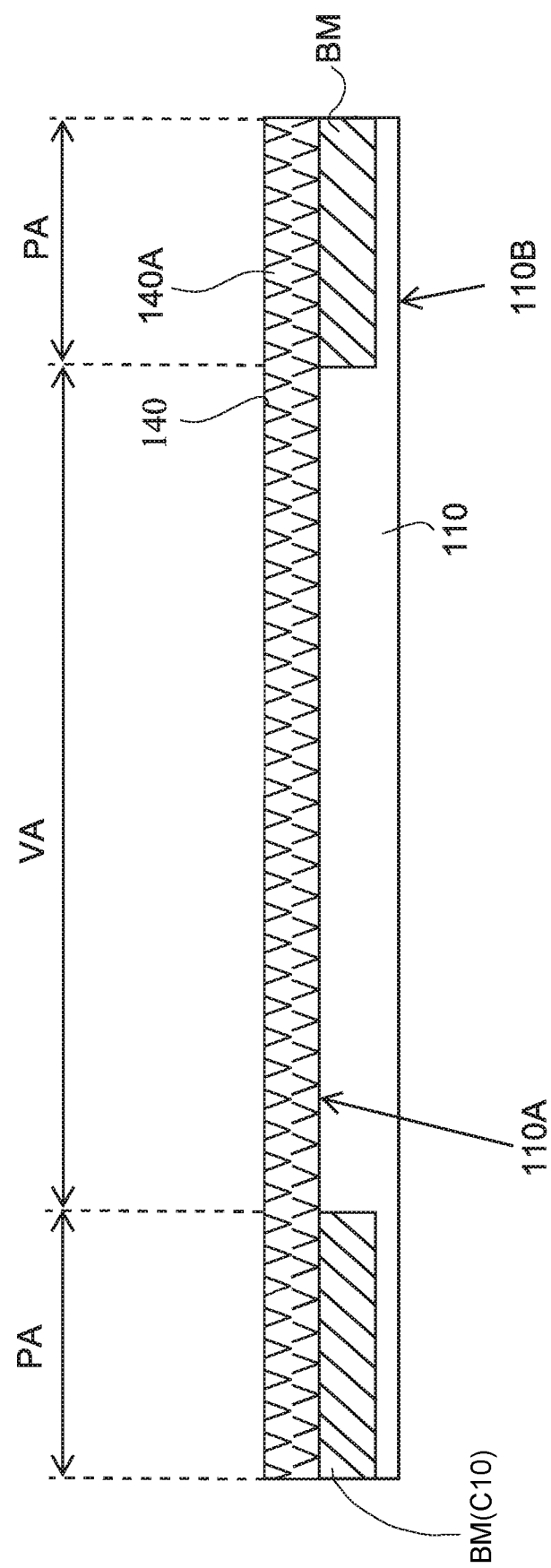
FIGS. 7A-7B are schematic diagrams showing a method of manufacturing a touch panel according to another embodiment of the present disclosure.

In another embodiment, the cover C10 of the embodiment of the present disclosure can perform the following steps to form an outer window having a touch sensing function. As shown in FIG. 7A, a metal nanowire layer 140A is formed on the cover C10 of the embodiment of the present disclosure, and the metal nanowire layer 140A may include at least metal nanowires 140. In an embodiment, the method includes: coating a dispersion or ink having metal nanowires 140 on the first surface 110A and then drying to form the metal nanowire layer 140A on the first surface 110A. In other words, the coated metal nanowires 140 are contributed to form the metal nanowire layer 140A on the first surface 110A by the above-mentioned drying and curing steps. Due to the coplanar and smooth surface structure of the first surface 110A, the metal nanowires 140 do not need to climb onto a protruded structure, i.e., a protruded BM layer, so the issues of electrical resistance and wire breakage of the conventional structure may be solved. In addition, due to the low surface roughness characteristic of the first surface 110A, the metal nanowire layer 140A has excellent uniformity of coating quality. As described above, it may define a display area VA and a peripheral area PA on the cover C10 according to the shielding layer BM embedded in the substrate 110, and the metal nanowire layer 140A may include a first portion formed in the display area VA and a second portion formed in the peripheral area PA. The second portion is connected with peripheral wires for transmitting signals.

In the embodiment of the present disclosure, the above dispersion may be water, alcohol, ketone, ether, hydrocarbon or aromatic solvent (benzene, toluene, xylene, etc.); the above-mentioned dispersion may also contain additives, surfactants or binders, such as carboxymethyl cellulose (CMC), 2-hydroxyethyl cellulose (HEC), hydroxypropyl methylcellulose (HPMC), sulfonate, sulfate, disulfonate, sulfosuccinate, phosphate or fluoro-containing surfactants, and the like. The metal nanowire layer may be, for example, a silver nanowire layer, a gold nanowire layer or a copper nanowire layer. The term of "metal nanowires" as used herein is a collective term referring to a collection of metal wires containing a plurality of elemental metals, metal alloys or metal compounds (including metal oxides). The amount of the containing metal nanowires does not affect the scope of the present disclosure; and at least one cross-sectional dimension (i.e., diameter of cross-section) of a single metal nanowire is less than 500 nm, or less than 100 nm, or less than 50 nm. The metal nanostructure referred to as "wire" in the present disclosure mainly has a high aspect ratio (length:diameter of cross section), for example, in a range of between 10 and 100,000, or greater than 10, or greater than 50, or greater than 100. Other terms, such as silk, fiber, tube, etc., which also has the above dimensions and high aspect ratios, are also within the scope of the present disclosure. The metal nanowire may be metal including, but not limited to, silver, gold, copper, nickel, and gold-plated silver.

The dispersion or slurry containing the metal nanowires 140 may be formed over the surface of the cover C10 by any means such as, but not limited to, a screen printing method, a nozzle coating method, a roller coating method or a slot die coating method. In one embodiment, the dispersion or slurry containing the metal nanowires 140 may be applied to the surface of continuously supplied covers C10 by using a roll-to-roll process.

In some embodiments of the present disclosure, the metal nanowires 140 may be silver nanowires or silver nanofibers, which may have an average diameter in a range of from about 20 to 100 nm, and an average length in a range of from about 20 to 100 microns, or an average diameter in a range of from about 20 to 70 nm, and an average length in a range of from about 20 to 70 microns (i.e., aspect ratio of 1,000). In some embodiments, the metal nanowires 140 may have a diameter in a range of between 70 nm and 80 nm and a length of about 8 micrometers.

Figure 7B:
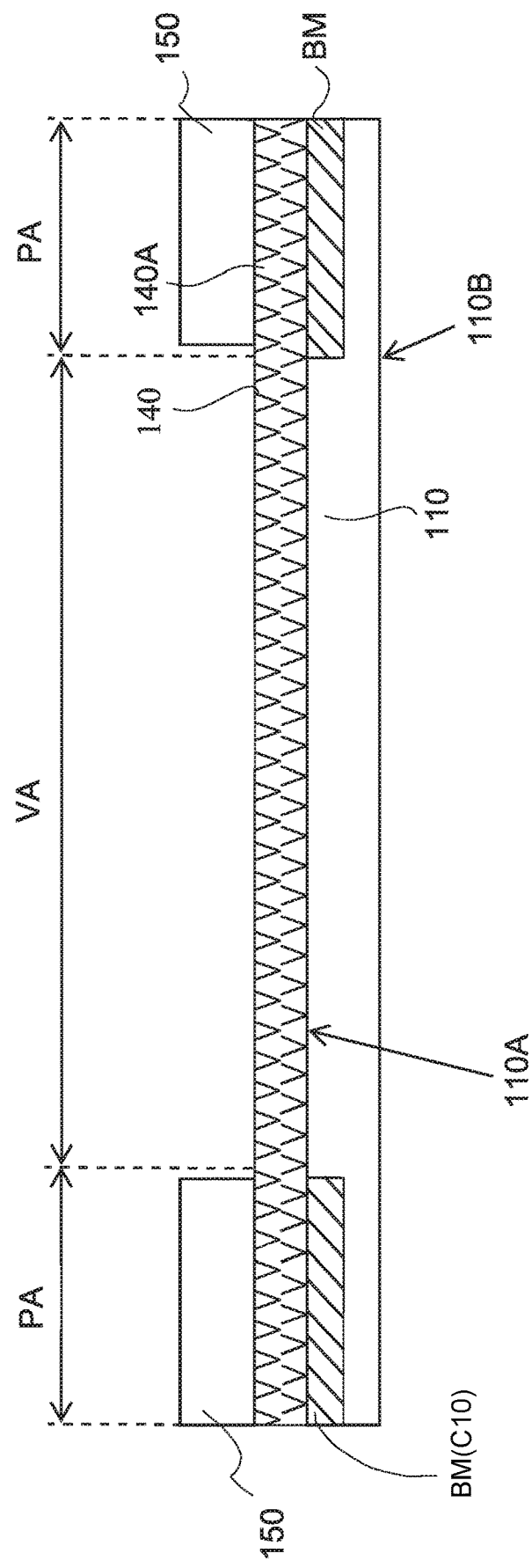

Next, referring to FIG. 7B, a metal layer 150 is disposed in the peripheral area PA of the cover C10. As shown in FIG. 7B, the metal layer 150 is disposed on the metal nanowire layer 140A. The metal layer 150 is substantially located in the peripheral area PA, but may also be extended from the peripheral area PA to the display area VA as needed.

In one embodiment, the metal layer 150 is formed using a conductive material which may be patterned by using exposure development. In an embodiment, the metal layer 150 is formed using a silver paste material by coating, but not limited thereto.

In an embodiment, the method of disposing the metal layer 150 at the peripheral area PA may be, but not limited to, coating the silver paste material at the peripheral area PA, and then curing the silver paste material to form the metal layer 150. In one embodiment, the temperature of the step of curing the silver paste material is in a range of from about 90° C. to 110° C., and the curing time is in a range of from about 10 to 20 minutes.

Figure 8:
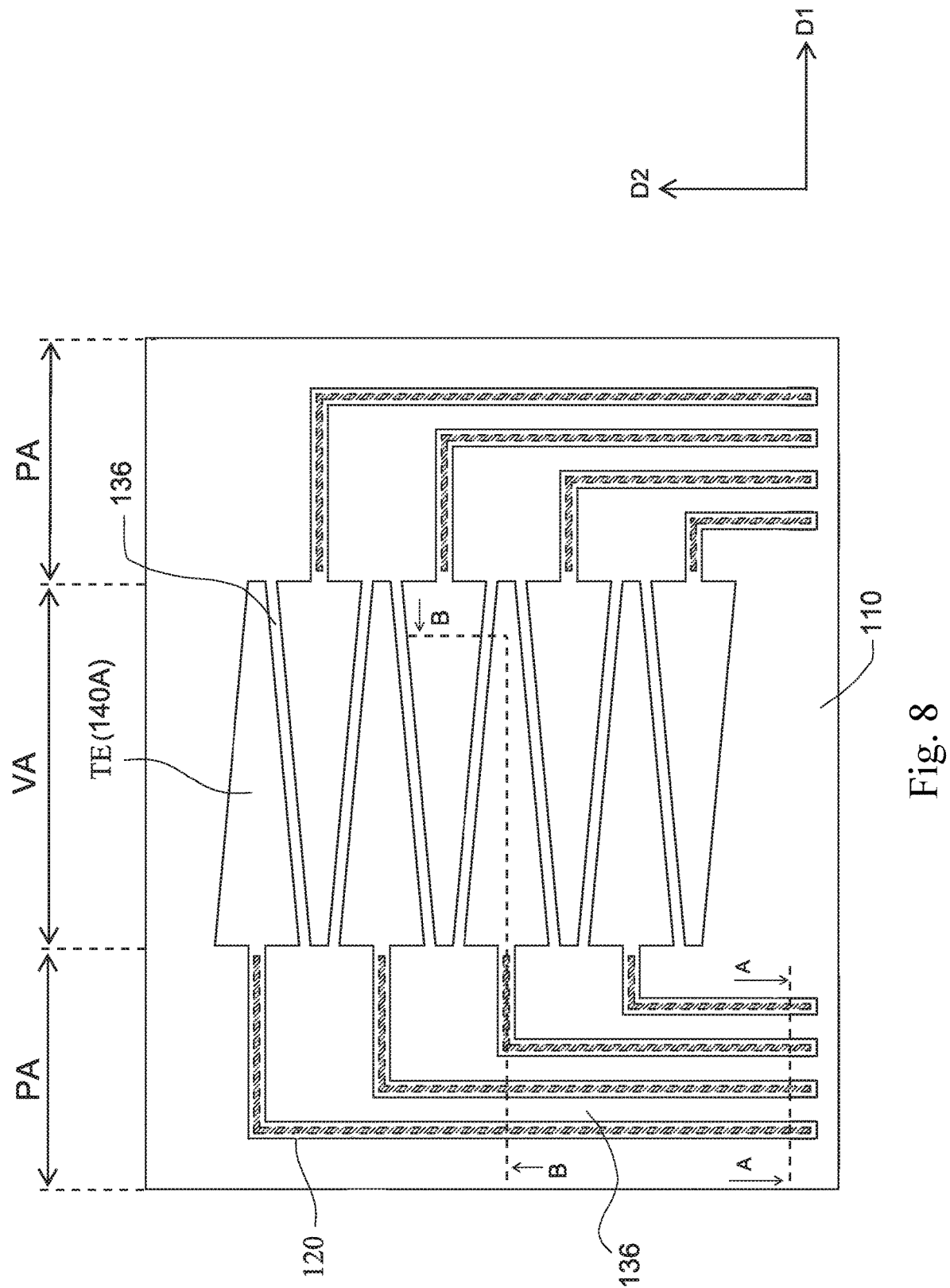
FIG. 8 is a schematic diagram of a touch panel according to another embodiment of the present disclosure.

Next, a patterning step is performed to form touch sensing electrodes TE and peripheral wires 120 on the cover. FIG. 8 is a schematic diagram showing the touch sensing electrodes TE and the peripheral wires 120 formed on the cover C10 of the embodiment of the present disclosure after being patterned. In one embodiment, the patterning step may be performed using processes such as photolithography, etching, and the like. In an embodiment, the method may include the steps of: performing a photolithography process to a photoresist to define remaining regions 130A and removal regions 130B of the metal nanowire layer 140A and the metal layer 150 (please refer to FIG. 8A and FIG. 8B); removing the material located in the removal regions 130B (including the metal nanowires 140, the photoresist material or the silver paste material) by using an etchant to form non-conductive regions 136, thereby achieving patterning of the metal nanowire layer 140A and the metal layer 150.

Thereby, the metal nanowire layer 140A located in the remaining regions 130A may be left to form the touch sensing electrodes TE. In other words, the touch sensing electrodes TE are formed by patterning the metal nanowire layer 140A located in the display area VA. The metal layer 150 located in the remaining regions 130A is left to form the peripheral wires 120. In other words, the peripheral wires 120 are formed by patterning the metal layer 150 located in the peripheral area PA, and the peripheral wires 120 transmit signals by the electrical connection formed between the metal nanowire layer 140A and the touch sensing electrodes TE. Alternatively, both the metal layer 150 and the metal nanowire layer 140A located in the peripheral area PA are etched simultaneously in an etchant so that the peripheral wire 120 includes a two-layer structure with a layer of metal and a layer of metal nanowire.

Figure 8A:
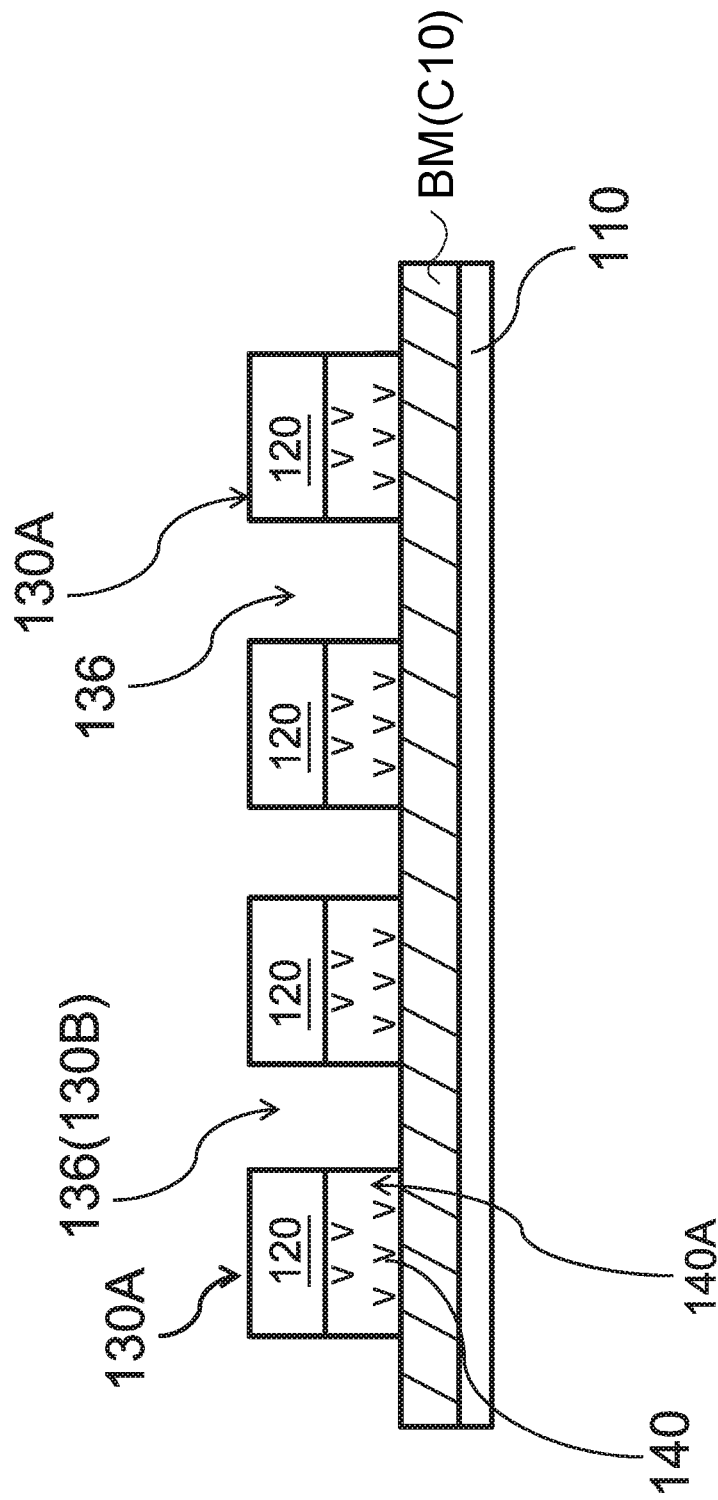
FIG. 8A is a cross-sectional view taken along line A-A of FIG. 8.
Figure 8B:
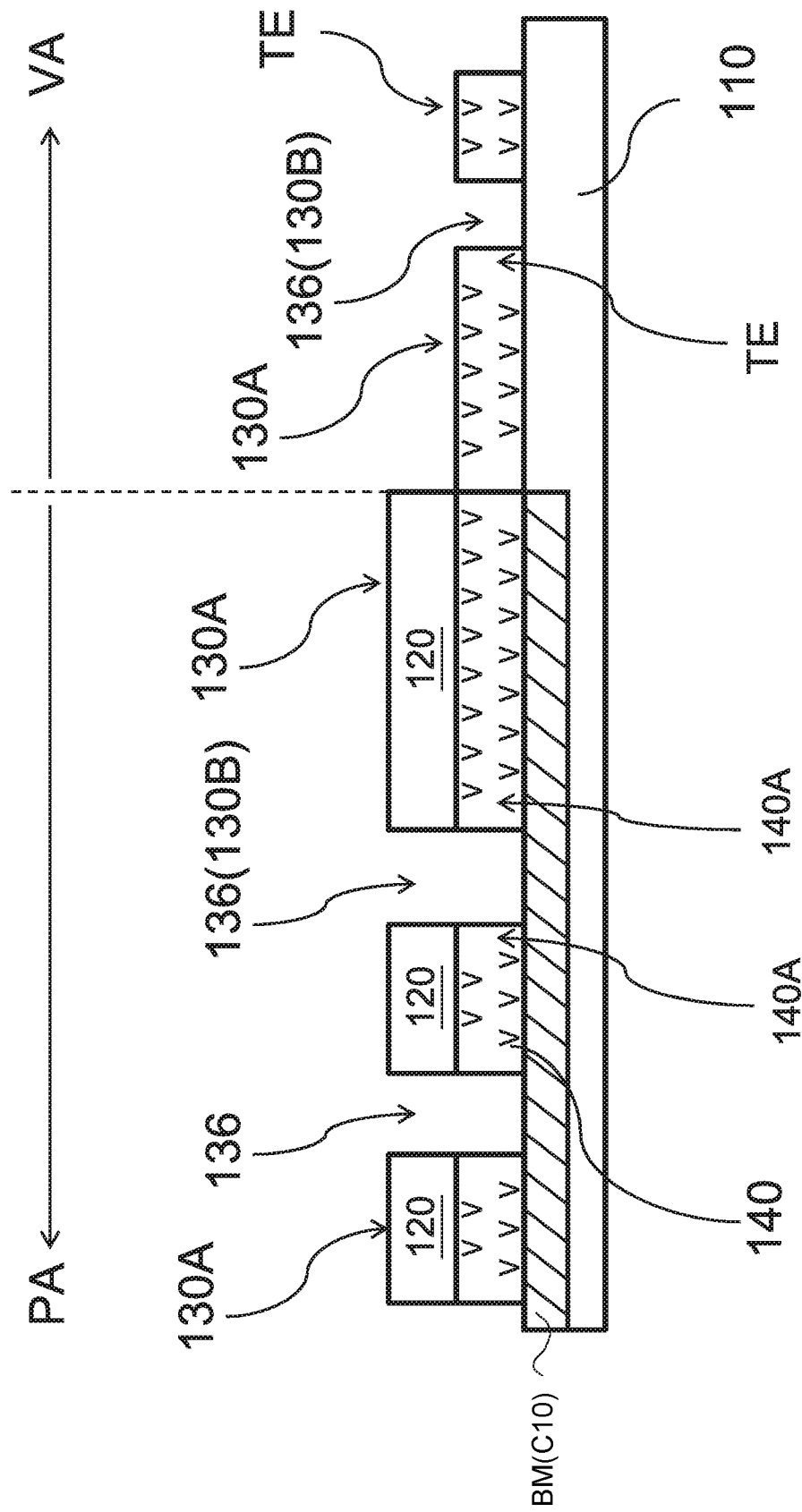
FIG. 8B is a cross-sectional view taken along line B-B of FIG. 8.

Please refer to FIG. 8, which shows a touch panel (i.e., a combination of the cover C10 of the embodiment of the present disclosure, the touch sensing electrodes TE and the peripheral wires 120) according to an embodiment of the present disclosure, and FIG. 8A and FIG. 8B are aspects of cross-sectional views taken along lines A-A and B-B of FIG. 8, respectively. A-A cross-section shows the aspect of the remaining regions 130A and the removal regions 130B of the peripheral area PA, and B-B cross-section shows the aspect of the remaining regions 130A and the removal regions 130B of the peripheral area PA and the display area VA. For the sake of simplicity, the shielding layer BM embedded in the substrate 110 is not drawn in FIG. 8, and it is clearly understood that the position of the shielding layer BM is substantially same as that of the peripheral area PA according to the foregoing description.

As shown in FIG. 8A and FIG. 8B, after exposure, development and etching are performed on the metal nanowire layer 140A and the metal layer 150 located in the peripheral area PA, the removal regions 130B and the remaining regions 130A may be defined, and the metal layer 150 and the metal nanowire layer 140A located in the removal regions 130B are removed to form voids/gaps (i.e., non-conductive regions 136), and the metal layer 150 located in the remaining regions 130A is defined to form peripheral wires 120. In addition, the metal nanowire layer 140A beneath the metal layer 150 is also patterned, and the adjacent peripheral wires 120 have the non-conductive region 136 therebetween. Further, both of the patterned metal layer 150 and the metal nanowire layer 140A are shielded by the shielding layer BM of the cover C10. The formed peripheral wires 120 and the metal nanowire layer 140A have no conventional climbing structure, so that the issue of manufacturing quality such as disconnection in the conventional structure may be solved. Since the two structural layers of the peripheral area PA are patterned in the same step, the conventional alignment step may be omitted, thereby reducing or avoiding the need for setting the alignment deviation area in the process. The width of the peripheral area PA is also reduced to achieve requirements of narrow frame of the touch panel/touch display. In an embodiment, side surfaces of the peripheral wires 120 are aligned with side surfaces of the remained metal nanowire layer 140A. In other words, the two structural layers of the peripheral area PA will have similar or identical patterns after the patterning step. In another embodiment, the two structural layers of the peripheral area PA are sequentially patterned in different steps (e.g., using two etching steps).

As shown in FIG. 8B, in the display area VA, the metal nanowire layer 140A in the remaining regions 130A is formed by using the above-mentioned development and etching processes to form the touch sensing electrodes TE. In the present embodiment, the metal nanowire layer 140A located in the removal regions 130B is removed to form voids/gaps to form non-conductive regions 136 between adjacent touch sensing electrodes TE. Furthermore, the touch sensing electrodes TE may be electrically connected to the peripheral wires 120 through the metal nanowire layer 140A on the peripheral area PA. As shown in FIG. 8, the touch panel of the present embodiment is a single-sided non-cross type touch panel, and the number of the touch sensing electrodes TE may be one or more. In more detail, the display area VA has a plurality of touch sensing electrodes TE extending along a same direction (e.g., first direction D1), and the length of each touch sensing electrode TE in the second direction D2 is incremented or decremented along the first direction D1. In addition, the spaces between the adjacent touch sensing electrodes TE are non-conductive regions 136 defined by the removal regions 130B in the above processes. As discussed above, the coated metal nanowire layer 140A has high uniformity on a smooth surface, and the touch sensing electrodes TE can also have the same uniformity after patterning. For example, the impedance/resistance difference between the different touch sensing electrodes TE is controlled, thereby improving the quality of sensing touch points and the transmitted signals. On the other hand, the difference in optical characteristics between the different touch sensing electrodes TE is also controlled, such that quality of output images is improved.

In an embodiment, as shown in FIG. 8A, the metal nanowires 140 (i.e., the metal nanowire layer 140A) between adjacent peripheral wires 120 are completely removed. In other words, the metal nanowires 140 between adjacent peripheral wires are completely removed by the above-mentioned patterning step and do not exist, so that insulating regions (i.e., non-conductive regions 136) may be formed, and the non-conductive regions 136 do not have the metal nanowires 140. That means, the non-conductive regions 136 of the embodiment are void/gap structures, and a concentration of the metal nanowires 140 distributed in the void structure is zero. Electrical isolation between adjacent peripheral wires 120 is formed so as to form circuit configuration of the touch panel. In another embodiment, the metal nanowires 140 located in the removal regions 130B may not be completely removed. However, a concentration of the remained metal nanowires 140 located in the removal regions 130B is less than a percolation threshold. In general, the concentration of the metal nanowires being lower than the percolation threshold means the adjacent metal nanowires are spaced too far apart, and thus the overall conductivity in the non-conductive regions 136 is low or zero. As a result, the metal nanowires with a concentration lower than the percolation threshold do not provide a continuous current path, and thus a conductive network of nanowire is not formed. That is, the metal nanowires in the non-conductive regions 136 form an electrically insulated network or a non-conductive network. In one embodiment, when a sheet resistance of a region or structure is higher than 108 ohm/square, or higher than 104 ohm/square, 3,000 ohm/square, 1,000 ohm/square, 350 ohm/square or 100 ohm/square, it may be considered as electrical insulation.

Similarly, as shown in FIG. 8B, the position of the removal regions 130B in the display area VA corresponds to the insulating areas (i.e., the non-conductive regions 136) between the adjacent touch sensing electrodes TE to define the touch sensing electrodes TE for sensing different touch positions. In other words, the non-conductive regions 136 between the adjacent touch sensing electrodes TE do not have metal nanowires 140. For example, the non-conductive regions 136 of the embodiment are void/gap structures, and a concentration of the metal nanowires 140 distributed in the void/gap structure is zero. In another embodiment, the metal nanowires 140 located in the removal regions 130B may not be completely removed, and a concentration of the remained metal nanowires 140 located in the removal regions 130B is less than a percolation threshold, so that the overall conductivity in the non-conductive regions 136 is low or zero. It should be noted that the non-conductive regions 136 are filled with a low concentration of metal nanowires to let the non-conductive regions 136 and the conductive regions have more similar optical characteristics, such as the refractive index of light at these two regions are more similar. As a result, more consistent display performance is achieved when the user views the screen displayed by the display through the touch panel of the embodiment of the present disclosure. In other words, the user is less likely to visually find the boundary between the non-conductive regions 136 and the conductive regions, especially for the product having wide line spacing between the touch sensing electrodes TE (i.e., widths of the non-conductive regions 136 are wide).

The metal nanowires 140 in the remaining regions 130A can form a conductive network, and the metal nanowire layer 140A forms a so-called transparent conductive layer. The transparent conductive layer in the display area VA after the above-mentioned patterning is acted as the touch sensing electrodes TE. For improving display effect, light transmission of the metal nanowire layer 140A may be greater than about 80%, and surface electrical resistance is in a range of between about 10 and 1,000 ohm/square. In some embodiments, the light transmission of the metal nanowire layer 140A is greater than about 85%, and the surface electrical resistance is in a range of between about 50 and 500 ohm/square.

In addition, the coated metal nanowires 140 may be further post-treated to increase its conductivity, and the post-treatment may include, for example, heating, plasma, corona discharge, UV ozone or pressure. For example, after the step of curing the metal nanowire layer 140A, a roller may be used to apply pressure thereon. In one embodiment, pressure in a range of from 50 to 3,400 psi may be applied to the metal nanowire layer 140A by one or more rollers. The applied pressure, in an embodiment, may be in a range of from 100 to 1,000 psi, 200 to 800 psi, or 300 to 500 psi. In some embodiments, heating and pressure post-treatment may be performed simultaneously. For example, the formed metal nanowires 140 may be applied with pressure via one or more rollers as described above and heated simultaneously, and the applied pressure by the roller is in a range of from 10 to 500 psi, or 40 to 100 psi. In this process, the roller is heated to a temperature in a range of from about 70° C. to 200° C., or about 100° C. to 175° C., which may enhance electrical conductivity of the metal nanowire layer 140A. In some embodiments, the metal nanowires 140 are exposed to a reducing agent for post-treatment. For example, the metal nanowires 140 made of nanosilver wires are exposed to a silver reducing agent for post-treatment. The silver reducing agent includes a borohydride such as sodium borohydride; a boron nitrogen compound such as dimethylaminoborane (DMAB); or a gas reducing agent such as hydrogen ($H_2$). The exposure time is in a range of from about 10 seconds to about 30 minutes, or from about 1 minute to about 10 minutes. The above step of applying pressure may be performed before or after the step of coating a photosensitive layer 130 according to actual needs.

In an embodiment, the metal nanowire 140 may be combined with an additional film layer to form a composite material layer. Examples of polymers for forming the film layer may include, but are not limited to, polyacrylic resin, such as polymethacrylate (e.g., poly(methyl methacrylate)), polyacrylate and polyacrylonitrile; polyvinyl alcohol; polyester (e.g., polyethylene terephthalate (PET), polyester naphthalate and polycarbonate); polymers with high aromaticity, such as phenolic resin or cresol-formaldehyde, polystyrene, polyvinyltoluene, polyvinyl xylene, polyimide, polyamide, poly amide-imide, polyetherimide, polysulfide, polysulfone, polyphenylene and polyphenyl ether; polyurethane (PU); epoxy resin; polyolefin (e.g. polypropylene, polymethylpentene and cyclic olefins); cellulose; polysiloxane and other silicon-containing polymers (e.g., polysilsesquioxanes and polysilane); polyvinyl chloride (PVC); polyacetate; polynorbornene; synthetic rubber (e.g., ethylene-propylene rubber (EPR), styrene-butadiene rubber (SBR), ethylene-propylene-diene monomer (EPDM); and fluoropolymers (e.g., polyvinylidene fluoride, polytetrafluoroethylene (TFE) or polyhexafluoropropylene); a non-conductive polymer such as a copolymer of fluoro-olefin and hydrocarbon-olefin, and a photosensitive material may be added into the above-mentioned polymer to meet the requirements of patterning by an exposure and development process. In other embodiments, an inorganic material such as silicon dioxide, mullite, silicon oxide, SiC, carbon fiber, $MgO$—$Al_2O_3$—$SiO_2$, $Al_2O_3$—$SiO_2$ or $MgO$—$Al_2O_3$—$SiO_2$—$Li_2O$ is used to form the film layer.

In addition, the above-mentioned polymer contributes certain chemical, mechanical, and optical properties to the composite structure made of the film layer and the metal nanowires 140. For example, the polymer provides for adhesion of the composite structure to the substrate 110 or improved physical mechanical strength, so the film layer may be referred to as a matrix. In another aspect, the film layer is formed using a certain polymer to provide additional surface protection of scratch and abrasion resistance, and the film layer may be referred to as an overcoat (OC). A material such as polyacrylate, epoxy resin, polyurethane, polysilane, polysiloxane, poly(silicon-acrylic acid) or the like may be used to let the composite structure have high surface strength to improve scratch resistance. Further, a crosslinking agent, a polymerization inhibitor, a stabilizer (e.g., antioxidant or UV stabilizer, but not limited thereto), a surfactant, or the like or mixture thereof may be added to the film layer or its polymer to improve the UV resistance of the composite structure or to achieve a longer shelf life. In other embodiments, the film layer may further include a corrosion inhibitor. However, the above is merely illustrative of the additive composition of the film layer, the possibility of additional functions/names, and not intended to limit the present disclosure.

Figure 9:
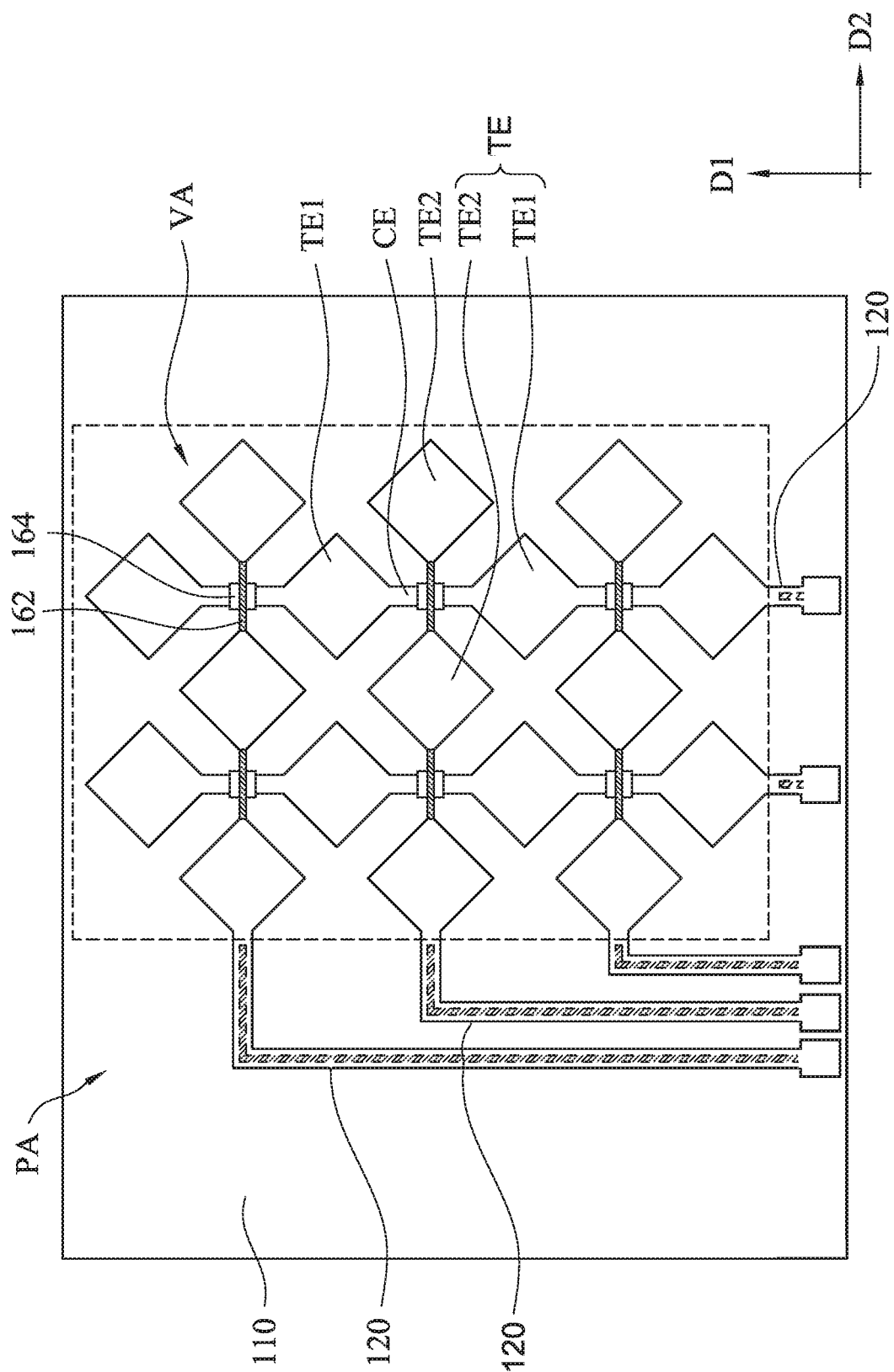
FIG. 9 is a schematic diagram of a touch panel according to another embodiment of the present disclosure.

The cover C10 of the present disclosure can also be applied to a cross type (also referred to as a bridge type) touch panel. Referring to FIG. 9, which shows the formed touch panel according to another embodiment of the present disclosure, and it is a combination of a cover C10 of the embodiment of the present disclosure, touch sensing electrodes TE (including first touch sensing electrodes TE1, second touch sensing electrodes TE2 and a connection electrode CE electrically connecting two adjacent first touch sensing electrodes TE1) and peripheral wires 120 of the embodiment of the present disclosure. The method may be, for example, but not limited to the following steps. First step is patterning a transparent conductive layer (e.g., the aforementioned metal nanowire layer 140A or ITO layer) formed on the cover C10 to form the touch sensing electrodes TE. The formed touch sensing electrodes TE includes: the first touch sensing electrodes TE1 arranged along a direction D1, the second touch sensing electrodes TE2 arranged along a second direction D2, and the connection electrode CE electrically connecting two adjacent first touch sensing electrodes TE1. Second step is disposing an insulating block 164 over the connection electrode CE. For example, silicon dioxide is used to form the insulating block 164. Third step is disposing a bridge wire 162 over the insulating block 164, for example, copper is used to form the bridge wire 162, and the bridge wire 162 connects the two adjacent second touch sensing electrodes TE2 along the second direction D2, and thus the insulating block 164 is located between the connecting electrode CE and the bridge wire 162 to electrically isolate the connecting electrode CE and the bridge wire 162 to allow the touch electrodes along the first direction D1 and the second direction D2 to be electrically isolated from each other. It should be noted that the peripheral wires 120 and the bridge wire 162 may be formed by metal (e.g., copper or silver) during the same process. As in the foregoing discussion, the peripheral wires 120 are shielded by the shielding layer BM of the cover C10, which is embedded in the substrate 110.

In this embodiment, the first touch sensing electrodes TE1 and the second touch sensing electrodes TE2 are structurally interlaced, and the two electrodes at two axes are used to sense touches or controlling gestures.

Figure 10:
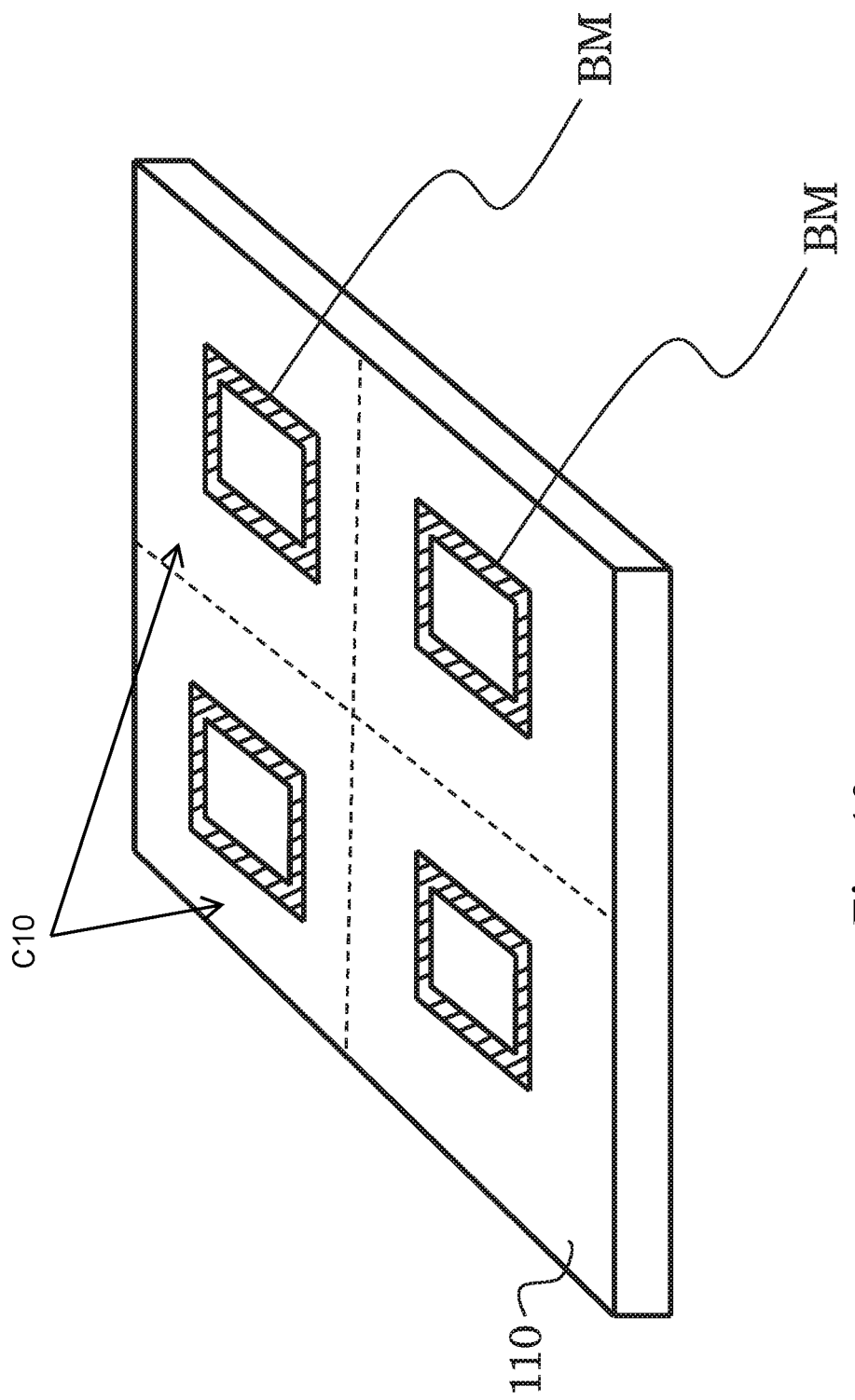
FIG. 10 is a schematic diagram of a base material of a cover according to an embodiment of the present disclosure.

In some embodiments, the cover C10 described herein may be fabricated by a roll to roll process, which can be used with existing equipment and fully automated to reduce the cost of manufacturing the cover and its touch panel. The roll to roll coating method includes the following steps. First step is selecting a flexible carrier plate 10 in a manner of tape-like supply, and mounting the tape-like carrier plate 10 between two rollers driven by a motor so that a continuous process can be performed on the carrier plate 10 along the moving path between the two rollers. Next, a slurry of a shielding layer BM in a using a storage tank is deposited over a surface of the carrier plate 10 by a spraying device, a brushing device, and the like, and the material id cured to form the shielding layer BM. Therefore, a plurality of the shielding layers BM may be formed on the surface of the carrier plate 10 in the step. The polymer of a substrate 110 is then deposited over the surface of the carrier plate 10 by using a spray head, and the polymer is cured to form the substrate 110 and covers the shielding layer BM. Each of shielding layers BM is embedded in the substrate 110 to construct a plurality of cover C10. Subsequently, the formed covers C10 are rolled up by the roller at the end of the production line to form a tape of the covers C10. After the demolding, as shown in FIG. 10, a product of rolled sheet having the covers C10 of the embodiment of the present disclosure is formed, and the sheet is cut to form a plurality of individual independent covers. For the detailed description of the embodiment, reference may be made to the foregoing description. For example, the shielding layer BM may have a hollow portion 160 or the shielding layer BM may be a single layer or a multi-layer structure, and the like, and not repeated herein.

In some embodiments of the present disclosure, the cover has a flat surface (i.e., the aforementioned coplanar surface or the smooth surface), and the cover of the embodiment of the present disclosure has no protruding shielding structure, so that the climbing issue in the traditional structure does not occur. Without the conventional climbing structure, the issue of disconnection caused by climbing is solved and thus the production yield is improved.

In some embodiments of the present disclosure, the roughness of coplanar surface of cover may be controlled. For example, the surface roughness Ra is in a range of from about 0.05 μm to 0.5 μm, so that the layer of metal nanowires may be more uniformly coated. As a result, the fabricated sensing electrodes or traces made of the layer of metal nanowires have more uniformly electrode characteristics (e.g., impedance/resistance or light transmission, etc.).

The cover of the embodiment of the present disclosure may be applied to a touch panel. For example, a layer of metal nanowires is printed on the cover of the embodiment of the present disclosure. The layer of metal nanowires is patterned to form touch sensing electrodes in a visible region and peripheral wires in a peripheral region by using a patterning method. Due to the aforementioned coplanar characteristic and low surface roughness, the difference in electrical resistance between the touch sensing electrodes and the peripheral wires of the embodiment of the present disclosure may be less than 10%.

The cover of the embodiment of the present disclosure may be applied to a touch panel, especially a flexible touch panel. Since the shielding layer is embedded in the substrate, and there is high bonding strength therebetween, it is suitable for a bendable or twistable touch panel. The touch panel of the embodiment of the present disclosure can pass the bending test of 100,000 times with a bending radius of R2.5.

The cover of the embodiment of the present disclosure may be used for fabricating single-sided touch panels in large batches.

While the disclosure has been described above in terms of various embodiments, it is not intended to be limiting, and it is understood that various alternations and modifications may be made without departing from the spirit and scope of the present disclosure. The scope of the present disclosure is defined by the scope of the appended claims.

What is claimed is:

1. A cover of touch-sensing devices, comprising:
   a shielding layer; and
   a substrate;
   wherein the shielding layer is embedded in the substrate, and the substrate and the shielding layer form a coplanar surface, the shielding layer comprises:
   a first shielding layer; and
   a second shielding layer;

wherein a first ink forms the first shielding layer, and a second ink forms the second shielding layer;

wherein an optical density of the second ink is higher than an optical density of the first ink; and wherein a bare/exposed surface of the shielding layer and a bare/exposed surface of the substrate defined by the shielding layer are coplanar.

2. The cover of claim 1, wherein the substrate entirely covers the shielding layer and is filled in a space defined by the shielding layer.

3. The cover of claim 1, wherein the shielding layer comprises a first shielding layer, a second shielding layer and a third shielding layer.

4. The cover of claim 3, wherein the first shielding layer, the second shielding layer and the third shielding layer form a stepped shielding structure.

5. The cover of claim 3, wherein the first shielding layer and the third shielding layer have a first pattern, and the second shielding layer has a second pattern different from the first pattern.

6. The cover of claim 1, wherein the shielding layer comprises a hollow portion.

7. The cover of claim 1, wherein the coplanar surface is a smooth surface.

8. The cover of claim 1, wherein the cover is flexible.

* * * * *